(12) United States Patent
Matsumoto et al.

(10) Patent No.: US 9,227,627 B2
(45) Date of Patent: Jan. 5, 2016

(54) CONTROL APPARATUS FOR HYBRID VEHICLE

(71) Applicants: Ryo Matsumoto, Seto (JP); Hiroatsu Endo, Nagoya (JP); Tetsuo Hori, Toyota (JP); Akihiro Sato, Nagoya (JP)

(72) Inventors: Ryo Matsumoto, Seto (JP); Hiroatsu Endo, Nagoya (JP); Tetsuo Hori, Toyota (JP); Akihiro Sato, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/114,821

(22) PCT Filed: Dec. 18, 2012

(86) PCT No.: PCT/JP2012/082821
§ 371 (c)(1),
(2) Date: Oct. 30, 2013

(87) PCT Pub. No.: WO2014/097401
PCT Pub. Date: Jun. 26, 2014

(65) Prior Publication Data
US 2015/0283994 A1    Oct. 8, 2015

(51) Int. Cl.
B60L 9/00        (2006.01)
B60L 11/00       (2006.01)
(Continued)

(52) U.S. Cl.
CPC ............. *B60W 20/108* (2013.01); *B60K 6/24* (2013.01); *B60K 6/442* (2013.01); *B60W 10/06* (2013.01);
(Continued)

(58) Field of Classification Search
CPC ............ B60W 20/108; B60W 10/12; B60W 30/1882; B60W 20/20; B60W 10/08; B60W 10/06; B60W 2510/0666; B60W 2710/125; B60W 2510/125; B60W 2400/00; B60W 2710/0677; B60W 10/26; B60W 20/00; B60W 2710/0666; B60K 6/24; B60K 6/442; B60K 6/365; B60K 6/40; B60K 6/52; B60K 6/44; B60K 6/448; B60K 2006/262; B60K 1/02; B60K 17/356; Y10S 903/93; Y10S 903/905; Y10S 903/916; Y10S 903/951; Y10S 903/91; Y10S 903/903; B60L 11/123; B60L 11/14; B60L 11/1861; B60L 15/2009; B60L 15/007; B60L 11/12; B60L 2220/14; B60L 2270/145; B60L 2260/28; B60L 2240/443; B60L 2250/24; B60L 2240/12; B60L 2250/26; B60L 2260/44; B60L 2240/441; B60L 2240/425; B60L 2240/486; B60L 2210/40; B60L 2240/423; B60L 2240/421; B60L 2220/52; Y02T 10/7044; Y02T 10/7241; Y02T 10/6217; Y02T 10/705; Y02T 10/7275; Y02T 10/648; Y02T 10/623; Y02T 10/7077; Y02T 10/6243; Y02T 10/646; Y02T 10/6286; Y02T 10/7005; Y02T 10/56; Y02T 10/641

See application file for complete search history.

(56) References Cited

U.S. PATENT DOCUMENTS 6,087,734 A    7/2000 Maeda et al.
8,900,080 B2 * 12/2014 Kawasaki et al. ............. 475/5
(Continued)

FOREIGN PATENT DOCUMENTS

| JP | B2-3052844  | 6/2000  |
| JP | A-2010-274726 | 12/2010 |
| JP | A-2011-88504 | 5/2011  |

*Primary Examiner* — Rodney Butler
(74) *Attorney, Agent, or Firm* — Oliff PLC

(57) ABSTRACT

A control apparatus is applied to a hybrid vehicle having a driving apparatus including a power split mechanism which splits torque of an internal combustion engine into a first MG and output portion, and a motor lock mechanism which switches a state of the power split mechanism between a differential state in which the torque of the internal combustion engine splits into the first MG and output portion and a non-differential state in which it is stopped to split the torque. The hybrid vehicle switches a driving mode between a first driving mode in which the power split mechanism is switched to the differential state and a second driving mode in which the power split mechanism is switched to the non-differential state. The control apparatus calculates energy loss of the driving apparatus in each driving mode, and switches the driving mode of the vehicle based on the calculated energy loss.

2 Claims, 14 Drawing Sheets

(51) Int. Cl.
- *B60W 20/00* (2006.01)
- *B60W 10/06* (2006.01)
- *B60W 10/08* (2006.01)
- *B60W 10/12* (2012.01)
- *B60K 6/442* (2007.10)
- *B60K 6/24* (2007.10)
- *B60W 30/188* (2012.01)

(52) U.S. Cl.
CPC ............... *B60W 10/08* (2013.01); *B60W 10/12* (2013.01); *B60W 20/20* (2013.01); *B60W 30/1882* (2013.01); *B60W 2400/00* (2013.01); *B60W 2510/0666* (2013.01); *B60W 2510/125* (2013.01); *B60W 2710/0677* (2013.01); *B60W 2710/125* (2013.01); *Y10S 903/905* (2013.01); *Y10S 903/93* (2013.01)

(56) References Cited

U.S. PATENT DOCUMENTS

| | | | |
|---|---|---|---|
| 2007/0197336 A1* | 8/2007 | Tabata et al. | 475/150 |
| 2012/0095635 A1 | 4/2012 | Kanno et al. | |
| 2013/0008759 A1* | 1/2013 | Kasuya et al. | 192/110 B |

* cited by examiner

CONTROL APPARATUS FOR HYBRID VEHICLE

TECHNICAL FIELD

The present invention relates to a control apparatus applied to a hybrid vehicle including a differential mechanism which splits a torque of an internal combustion engine into a first motor generator and a drive wheel, and a second motor generator capable of driving the drive wheel.

BACKGROUND ART

There is known a hybrid vehicle including a differential mechanism which splits a torque of an internal combustion engine into a first motor generator and a drive wheel, and a second motor generator capable of driving the drive wheel. In a power output apparatus which is incorporated in such hybrid vehicle, there is known a control apparatus which calculates a power to be output from an internal combustion engine based on a driving force required to the vehicle, and controls the internal combustion engine, the first motor generator, and the second motor generator so that the calculated power is output and the internal combustion engine is operated at an operational point having high efficiency (see Patent Literature 1).

CITATION LIST

Patent Literature

Patent Literature 1: JP-B-3052844

SUMMARY OF INVENTION

Technical Problem

In the hybrid vehicle including the differential mechanism shown in Patent Literature 1, by providing with a mechanism capable of stopping the split of the torque by the differential mechanism, it is possible to make the vehicle run in two driving modes which are: a driving mode in which the torque of the internal combustion engine is split into the drive wheel and the first motor generator by the differential mechanism; and another driving mode in which all of the torque of the internal combustion engine is transmitted to the drive wheel. When the torque is split by the differential mechanism, the operational point of the internal combustion engine is not restricted by the driving force required to the vehicle as shown in Patent Literature 1. However, in this case, energy loss of the first motor generator is produced. On the other hand, when the split of the torque by the differential mechanism is stopped, the energy loss of the first motor generator is not produced. However, in this case, the operational point of the internal combustion engine is restricted by the driving force required to the vehicle. Thereby, by switching such two driving modes to each other appropriately, there is a possibility that an energy efficiency of the vehicle can be improved further.

In view of the foregoing, one object of the present invention is to provide a control apparatus for hybrid vehicle capable of improving the energy efficiency of the vehicle and improving fuel efficiency.

Solution to Problem

A control apparatus of the present invention which is applied to a hybrid vehicle in which a driving apparatus is mounted, the driving apparatus including: an internal combustion engine; a first motor generator; an output portion for transmitting torque to a drive wheel; a differential mechanism which splits torque of the internal combustion engine into the first motor generator and the output portion; a second motor generator which is connected with the output portion via a gear; and a state switching device which is capable of switching a state of the differential mechanism between a differential state in which the torque of the internal combustion engine is split into the first motor generator and the output portion, and a non-differential state in which it is stopped to spilt the torque, and the hybrid vehicle is capable of switching a driving mode between a first driving mode in which the state of the differential mechanism is switched to the differential state, and a second driving mode in which the state of the differential mechanism is switched to the non-differential state, the control apparatus comprising: a first energy loss calculating device which calculates energy loss in the driving apparatus to be generated when it is assumed that the driving mode of the vehicle is switched to the first driving mode, based on energy loss in the internal combustion engine, energy loss in the first motor generator, and energy loss in the second motor generator; a second energy loss calculating device which calculates energy loss in the driving apparatus to be generated when it is assumed that the driving mode of the vehicle is switched to the second driving mode, based on energy loss in the internal combustion engine to be generated when the internal combustion engine is operated in a rotational speed determined depending on speed of the vehicle and torque determined depending on driving force required to the vehicle, and the energy loss in the second motor generator; and a driving mode switching device which switches the driving mode of the vehicle based on the energy loss which is calculated by the first energy loss calculating device and the energy loss which is calculated by the second energy loss calculating device.

According to the control apparatus of the present invention, since the driving mode of the vehicle is switched based on the energy loss of the driving apparatus in the first driving mode and the energy loss of the driving apparatus in the second driving mode, it is possible to switch the driving mode of the vehicle to the driving mode in which the energy loss is small. As a result, since it is possible to decrease energy which is wasted in the vehicle, it is possible to improve the energy efficiency of the vehicle. Thereby, it is possible to improve the fuel efficiency of the vehicle.

In one embodiment of the control apparatus of the present invention, the internal combustion engine may have plural cylinders and may be operated in: a reduced-cylinder operation mode in which a portion of the plural cylinders is deactivated and remaining cylinders are activated; or an all-cylinder operation mode in which all cylinders are activated, in the first driving mode and the second driving mode, the internal combustion engine is operated in the all-cylinder operation mode, a third driving mode in which the internal combustion engine is operated in the reduced-cylinder operation mode and the state of the differential mechanism is switched to the non-differential state may be further set as one of the driving modes of the vehicle, the control apparatus may further comprise a third energy loss calculating device which calculates energy loss in the driving apparatus to be generated when it is assumed that the driving mode of the vehicle is switched to the third driving mode, based on energy loss in the internal combustion engine to be generated when the internal combustion engine is operated in rotational speed which is determined depending on speed of the vehicle and torque which is determined depending on driving force required to the vehicle, friction loss in the portion of the plural cylinders, and the energy loss in the second motor generator, and the driving mode switching device may switch the driving mode of the vehicle based on the energy loss which is calculated by the first energy loss calculating device, the energy loss which is calculated by the second energy loss calculating device, and the energy loss which is calculated by the third energy loss calculating device. According to this embodiment, even if three driving modes are provided as the driving mode of the vehicle, it is possible to switch the driving mode of the vehicle to the driving mode in which the energy loss is the smallest in a current running state. Thereby, it is possible to improve the energy efficiency of the vehicle, and it is possible to improve the fuel efficiency.

In this embodiment, a fourth driving mode in which the internal combustion engine is operated in the reduced-cylinder operation mode and the state of the differential mechanism is switched to the differential state may be further set as one of the driving modes of the vehicle, the control apparatus may further comprise a fourth energy loss calculating device which calculates energy loss in the driving apparatus to be generated when it is assumed that the driving mode of the vehicle is switched to the fourth driving mode, based on the energy loss in the internal combustion engine, the friction loss in the portion of the plural cylinders, and the energy loss in the second motor generator, and the energy loss in the second motor generator, and the driving mode switching device may switch the driving mode of the vehicle based on the energy loss which is calculated by the first energy loss calculating device, the energy loss which is calculated by the second energy loss calculating device, the energy loss which is calculated by the third energy loss calculating device, and the energy loss which is calculated by the fourth energy loss calculating device. Also in this embodiment, it is possible to switch the driving mode of the vehicle to the driving mode in which the energy loss is the smallest in the current running state. Thereby, it is possible to improve the energy efficiency of the vehicle, and it is possible to improve the fuel efficiency.

In this embodiment, the control apparatus may further comprise a memory device which stores a map in which the speed of the vehicle and the driving torque required to the vehicle are corresponded to each of the first driving mode, the second driving mode, and the fourth driving mode, wherein the driving mode switching device may switch the driving mode of the vehicle based on the speed of the vehicle, the driving torque required to the vehicle, and the map, in the map, a first region which corresponds to the first driving mode, a second region which corresponds to the second driving mode, and third region which corresponds to the fourth driving mode are set so as not to overlap each other, the third region may include a region in which the speed of the vehicle is greater than or equal to a predetermined high-speed running determination value and the driving torque required to the vehicle is less than a predetermined low torque determination value in the map, the second region may include a region in which the speed of the vehicle is greater than or equal to a predetermined low-speed running determination value; and the driving torque required to the vehicle is greater than or equal to the low torque determination value and also less than a predetermined high torque determination value in the map, and the first region may include a region in which the speed of the vehicle is less than the low-speed running determination value and the driving torque required to the vehicle is greater than or equal to the high torque determination value in the map.

When the speed of the vehicle (vehicle speed) is high and the driving torque which is required to the vehicle is low, it is possible to run the vehicle even if power which is output from the internal combustion engine is low. Thereby, in such case, by operating the internal combustion engine in the reduced-cylinder operation mode, it is possible to decrease fuel which is consumed in the internal combustion engine. In this embodiment, the third region includes a such region. When the vehicle speed is medium speed and the driving torque which is required to the vehicle is medium, it is necessary to output a certain amount of the power from the internal combustion engine. In such running state, the internal combustion engine is operated in the all-cylinder operation mode. If in such running state, it is possible to run the vehicle by using torque which is output from the internal combustion engine, even if the state of the differential mechanism is switched to the non-differential state. And, by switching the state of the differential mechanism to the non-differential state, it is unnecessary to output reactive torque against the torque of the internal combustion engine from the first motor generator. Thereby, it is possible to decease the energy loss in the first motor generator. The second region includes a such region. And, when the vehicle runs at low speed and high torque, it is necessary to output large torque from the internal combustion engine. Thereby, it is necessary to operate the internal combustion engine in the all-cylinder operation mode. Furthermore, the state of the differential mechanism is switched to the differential state. And, the torque amplifies by the differential mechanism. The first region includes a such region. According to this embodiment, since the driving mode of the vehicle is switched based on the map in which each region is set in this manner, it is possible to improve the energy efficiency of the vehicle while running the vehicle appropriately. Thereby, it is possible to improve the fuel efficiency.

DESCRIPTION OF EMBODIMENTS

First Embodiment

Figure 1:
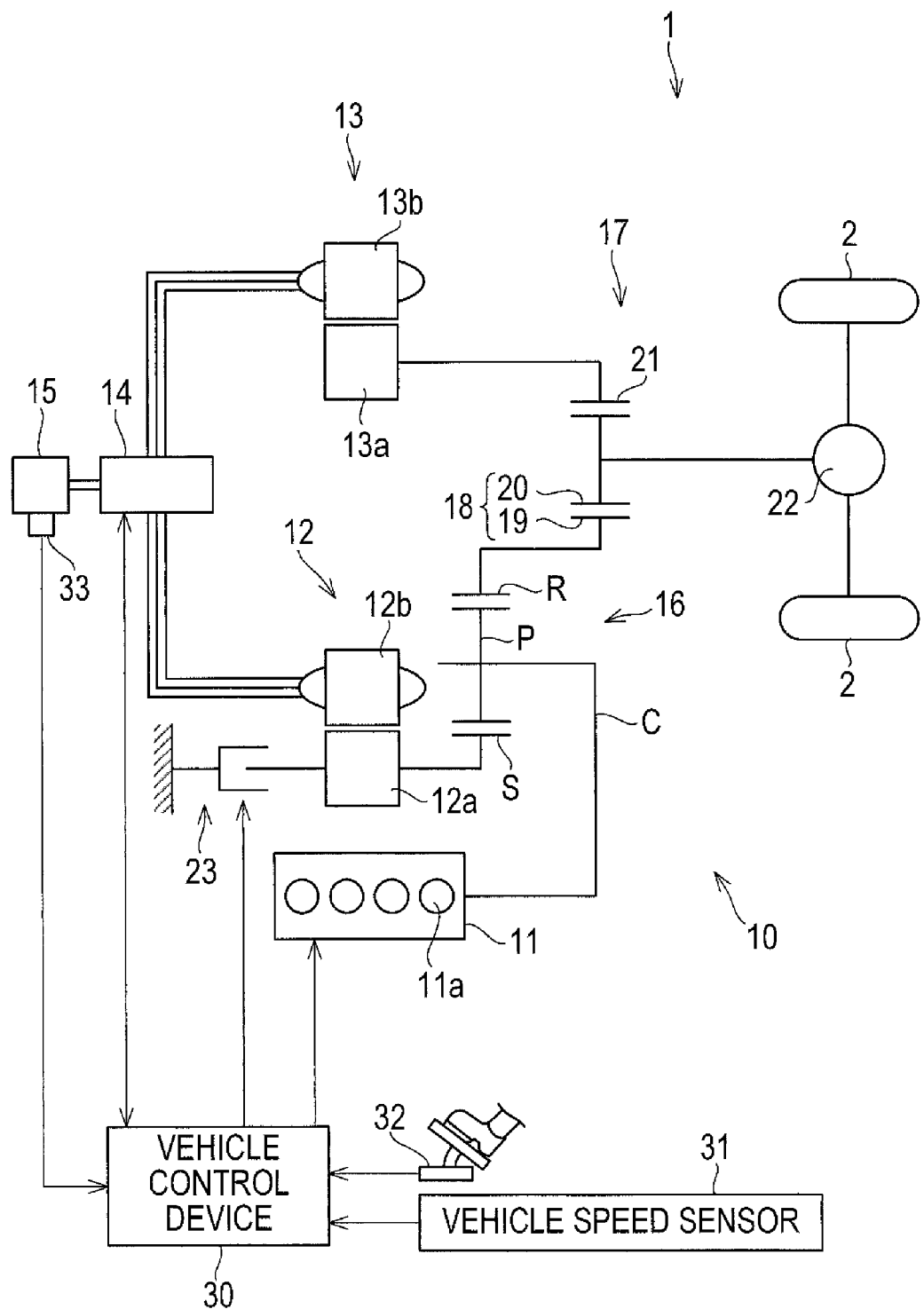
FIG. 1 is a skeleton diagram showing a vehicle incorporated in a control apparatus according to a first embodiment of the present invention.

FIG. 1 shows a skeleton diagram of a vehicle incorporated in a control apparatus according to a first embodiment of the present invention. The vehicle 1 is configured as a hybrid vehicle which has plural power sources. A driving apparatus 10 for running the vehicle 1 is mounted on the vehicle 1. The driving apparatus 2 includes an internal combustion engine (hereinafter, referred to as an engine) 11, a first motor generator (hereinafter, referred to as a first MG) 12, and a second motor generator (hereinafter, referred to as a second MG) 13. The engine 11 is configured as a serial four-cylinder engine having four cylinders 11a. The engine 11 is capable of operating in two operation modes: one is an all-cylinder operation mode; and another one is a reduced-cylinder operation mode. In the all-cylinder operation mode, all four cylinders 11a are activated. On the other hand, in the reduced-cylinder operation mode, two cylinders 11a in the four cylinders 11a are deactivated, and remaining two cylinders 11a are activated.

Each of the first MG 12 and the second MG 13 is a well known motor generator which functions as an electric motor and a generator. The first MG 12 includes a rotor 12a and a stator 12b which is arranged on an outer circumference of the rotor 12a coaxially and is fixed to a case (not shown). The second MG 13 also includes a rotor 13a and a stator 13b which is arranged on an outer circumference of the rotor 13a coaxially and is fixed to a case. Each MG 12, 13 is connected to a battery 15 via a motor control device 14. The motor control device 14 coverts electric power which has been generated at each MG 12, 13 into direct current and charges the electrical power to the battery 15. Furthermore, the motor control device 14 converts electric power of the battery 15 into alternate current and supplies the electric power to each MG 12, 13.

The engine 11 and the first MG 12 are connected to a power split mechanism 16. The power split mechanism 16 is configured as a single pinion type planetary gear mechanism. The power split mechanism 16 includes a sun gear S which is as an external gear, a ring gear R which is an internal gear disposed coaxially with the sun gear S, and a carrier C which supports a pinion gear P meshing with these gears S, R so that the pinion gear P is capable of rotating and is capable of revolving around the sun gear S. The sun gear S is connected to the rotor 12a of the first MG 12 so as to rotate together. The carrier C is connected to an output shaft 11b of the engine 11 so as to rotate together.

The power split mechanism 16 is also connected with an output portion 17 for transmitting a torque to drive wheels 2 of the vehicle 1. The output portion 17 includes an output gear train 18. The output gear train 18 includes an output drive gear 19 and an output driven gear 20 which meshes to the output drive gear 19. The output drive gear 19 is connected to the ring gear R of the power split mechanism 16 so as to rotate together. The output driven gear 20 is connected with the second MG 13 via a gear 21. The gear 21 is connected to a rotor 13a of the second MG 13 so as to rotate together. A torque output from the output driven gear 20 is split into a right drive wheel 2 and a left drive wheel 2 via a differential mechanism 22.

The power split mechanism 16 is provided with a motor lock mechanism 23 as a state switching device. The motor lock mechanism 23 can switch a state of the power split mechanism 16 between a differential state in which a torque of the engine 1 is split into the first MG 12 and the output gear train 18, and a non-differential state in which the split of the torque is stopped. The motor lock mechanism 23 is configured as a wet multi-plate type brake mechanism. The state of the motor lock mechanism 23 is switched between an engaged state in which rotation of the rotor 12a of the first MG 12 is prevented and a released state in which the rotation of the rotor 12a is permitted. The switching between the engaged state and the released state with respect to the motor lock mechanism 23 is executed by a hydraulic actuator (not shown). When the motor lock mechanism 23 is switched to the engaged state, the rotation of the rotor 12a of the first MG 12 is prevented. As a result, rotation of the sun gear S of the power split mechanism 16 is prevented. Thereby, the split of the torque of the engine 11 to the first MG 12 is stopped and the power split mechanism 16 is switched to the non-differential state.

Each part of the vehicle 1 is controlled by a vehicle control device 30. The vehicle control device 30 is configured as a computer unit including a microprocessor and peripheral devices, such as a RAM and a ROM, which are necessary for the operations of the microprocessor. The vehicle control device 30 holds various control programs for running the vehicle 1 appropriately. The vehicle control device 30 controls controlled objects such as the engine 11 and each MG 12, 13 by executing these programs. The vehicle control device 30 controls each MG 12, 13 by controlling the motor control device 14. The vehicle control device 30 is connected with various sensors for obtaining information with respect to the vehicle 1. The vehicle control device 30 is connected with a vehicle speed sensor 31, an accelerator position sensor 32, and a state of charge (SOC) sensor 33, for example. The vehicle speed sensor 31 outputs a signal corresponding to speed of the vehicle 1 (vehicle speed). The accelerator position sensor 32 outputs a signal corresponding to an amount of depression of an accelerator pedal, that is, an accelerator opening degree. The SOC sensor 33 outputs a signal corresponding to a state of charge of the battery 15. In addition to the above sensors, various sensors and switches are further connected to the vehicle control device 30, but they are omitted in the figure.

In this vehicle 1, four driving modes are realized by switching the operation mode of the engine 11 and the state of the motor lock mechanism 23. In a first driving mode, the engine 11 is operated in the all-cylinder operation mode, and the motor lock mechanism 23 is switched to the released state. In a second driving mode, the engine 11 is operated in the all-cylinder operation mode, and the motor lock mechanism 23 is switched to the engaged state. In a third driving mode, the engine 11 is operated in the reduced-cylinder operation mode, and the motor lock mechanism 23 is switched to the engaged state. In a fourth driving mode, the engine 11 is operated in the reduced-cylinder operation mode, and the motor lock mechanism 23 is switched to the released state.

The vehicle control device 30 calculates energy loss being expected to be generated in the driving apparatus 10 if the driving mode of the vehicle 1 is switched to any one of the four driving modes based on the present vehicle speed, a driving torque required to the vehicle, and the state of charge of the battery 15. And, the vehicle control device 30 switches the driving mode of the vehicle 1 based on the calculated energy loss.

A calculation method of the energy loss being expected to be generated in the driving apparatus 10 will be described. The energy loss of the driving apparatus 10 mainly includes energy loss of the engine 11, energy loss of the first MG 12, and energy loss of the second MG 13. The energy losses being expected to be generated in these portions are calculated respectively, and a sum of calculated energy losses is determined as the energy loss of the driving apparatus 10.

Figure 2:
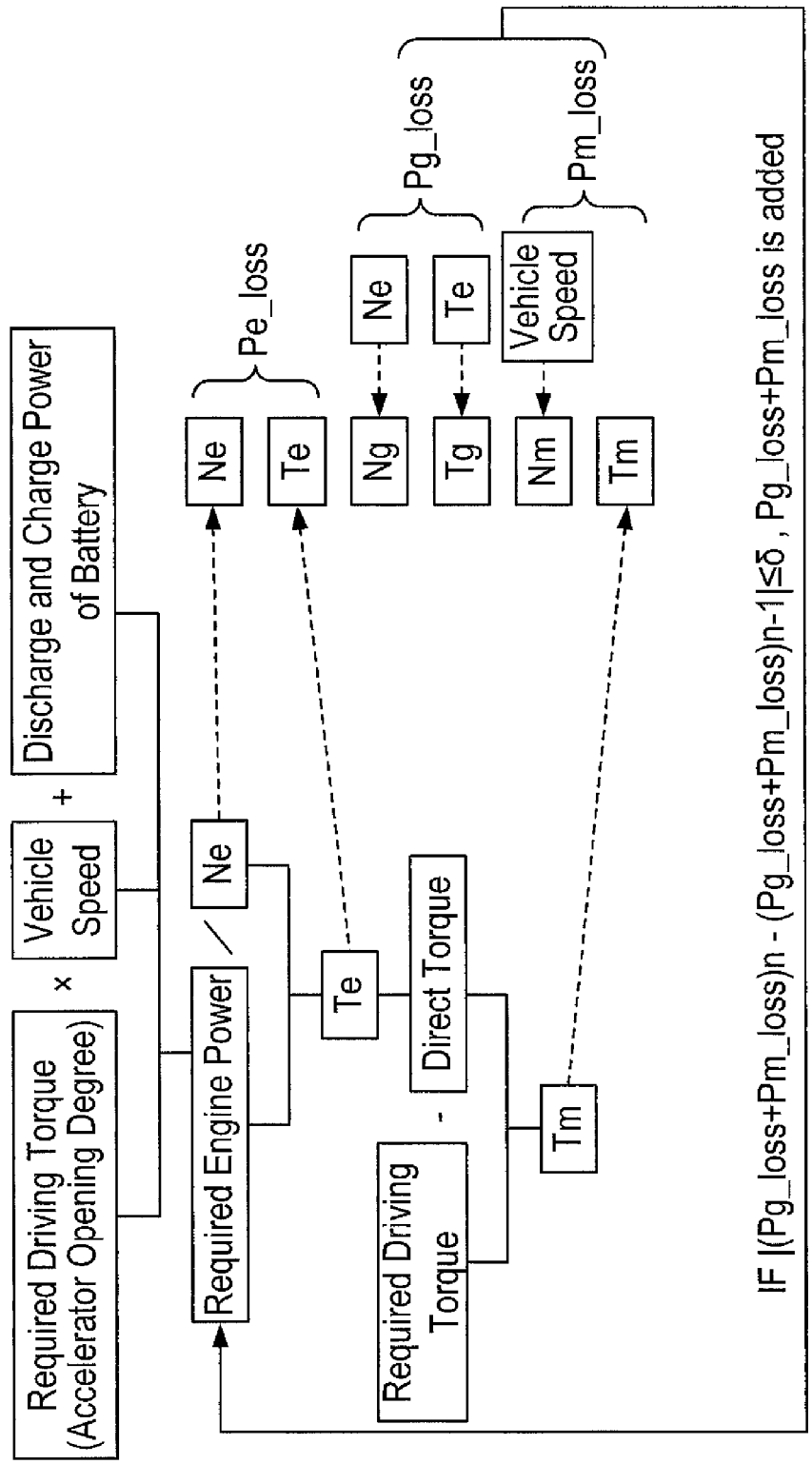
FIG. 2 is a diagram showing a calculation method of torque and rotational speed of an engine, a first MG, and a second MG when a motor lock mechanism is in a released state.
Figure 3:
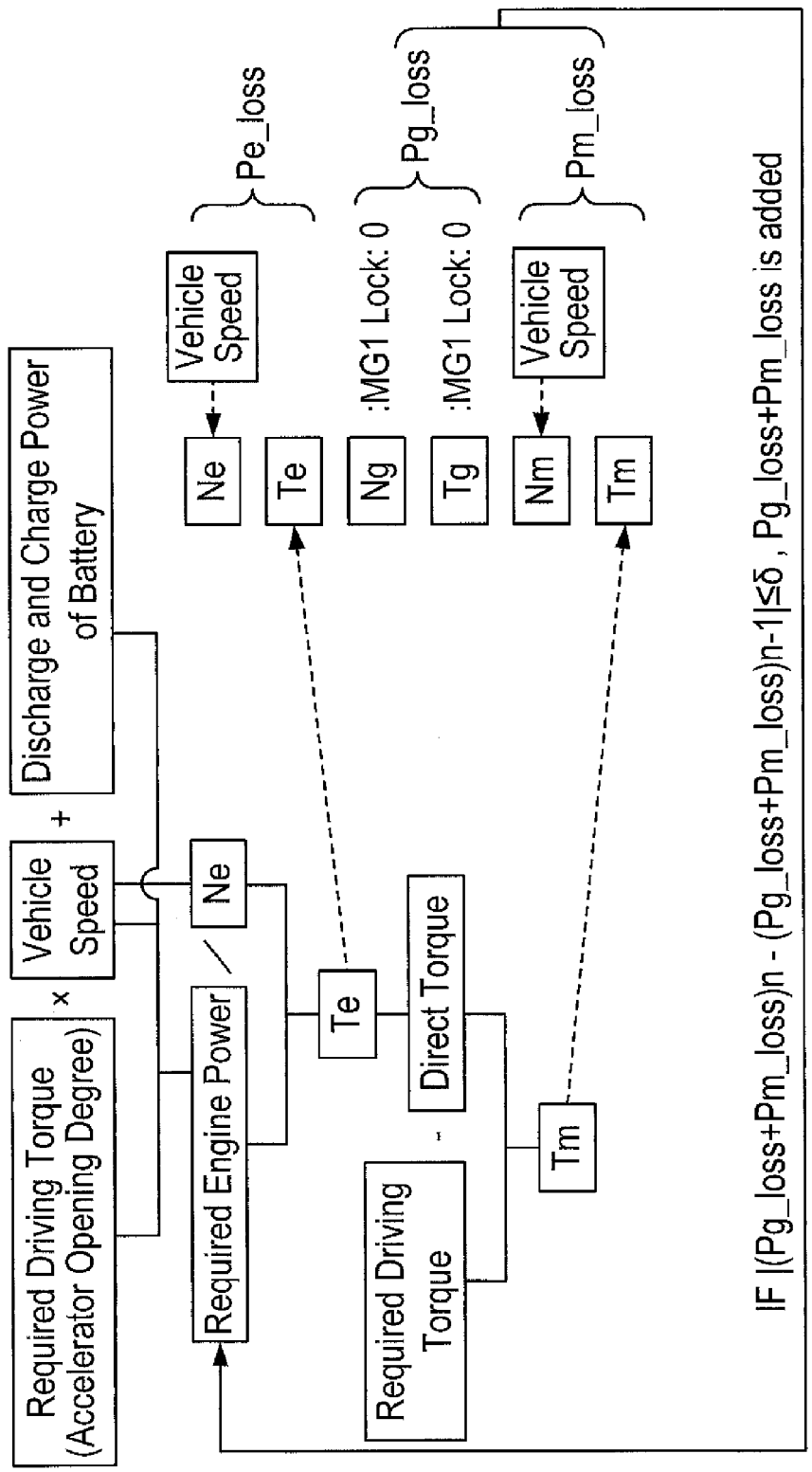
FIG. 3 is a diagram showing a calculation method of torque and rotational speed of the engine, the first MG, and the second MG respectively when the motor lock mechanism is in an engaged state.

In order to calculate the energy loss of each of the engine 11, the first MG 12, and the second MG 13, required are the torque and the rotational speed with respect to each of the engine 11, the first MG 12, and the second MG 13 in the case where the driving mode is switched based on a current state of the vehicle 1. An estimation method for these ones will be described with reference to FIG. 2 and FIG. 3. FIG. 2 shows a calculation method of the torque and the rotational speed with respect to each of the engine 11, the first MG 12, and the second MG 13 when the motor lock mechanism 23 is in the released state. FIG. 3 shows a calculation method of the torque and the rotational speed with respect to each of the engine 11, the first MG 12, and the second MG 13 when the motor lock mechanism 23 is in the engaged state. In these figures, "Ne" shows the rotational speed of the engine 11, and "Te" shows the torque of the engine 11. Furthermore, "Ng" shows the rotational speed of the first MG 12, and "Tg" shows the torque of the first MG 12. "Nm" shows the rotational speed of the second MG 13, and "Tm" shows the torque of the second MG 13.

A calculation method of the torque and the rotational speed with respect to each of the engine 11, the first MG 12, and the second MG 13 when the driving mode of the vehicle 1 is switched to the first driving mode will be described with reference to FIG. 2. As shown in this figure, power required to the engine 11 (referred to as required engine power) is calculated by multiplying the driving torque required to the vehicle 1 by the vehicle speed, and adding the result of multiplying and discharge and charge power of the battery 15. In this vehicle 1, the power to be output from the engine 11 is changed in both cases: when the torque is output from the second MG 13; and when the first MG 12 or the second MG 13 generates electricity. In this vehicle 1, the second MG 13 is operated by electric power supplied from the battery 15, and it is possible to drive the drive wheels 2 by the torque output from the second MG 13. In this case, it is possible to decrease the power to be output from the engine 11 as compared to a case where the torque is not output from the second MG 13. At this moment, the torque to be output from the second MG 13, that is, the power discharged from the battery 15 is set so that the efficiency of the engine 1 is increased. When a remaining amount of the battery 15 is less than or equal to a predetermined determination value, it is necessary to charge the battery 15 by generating electricity at the first MG 12 or the second MG 13. In this case, since it is necessary to drive the first MG 12 or the second MG 13 by the engine 11, the power to be output from the engine 11 is increased. The discharge and charge power of the battery 15 is power which is added to the driving apparatus 10 by discharging or charging of the battery 15 in this manner. Thereby, the discharge and charge power is obtained based on a capacity of the battery 15, the remaining amount, and the operating state of the engine 1. The required driving torque may be calculated based on the accelerator opening degree by using a well known method.

Figure 4:
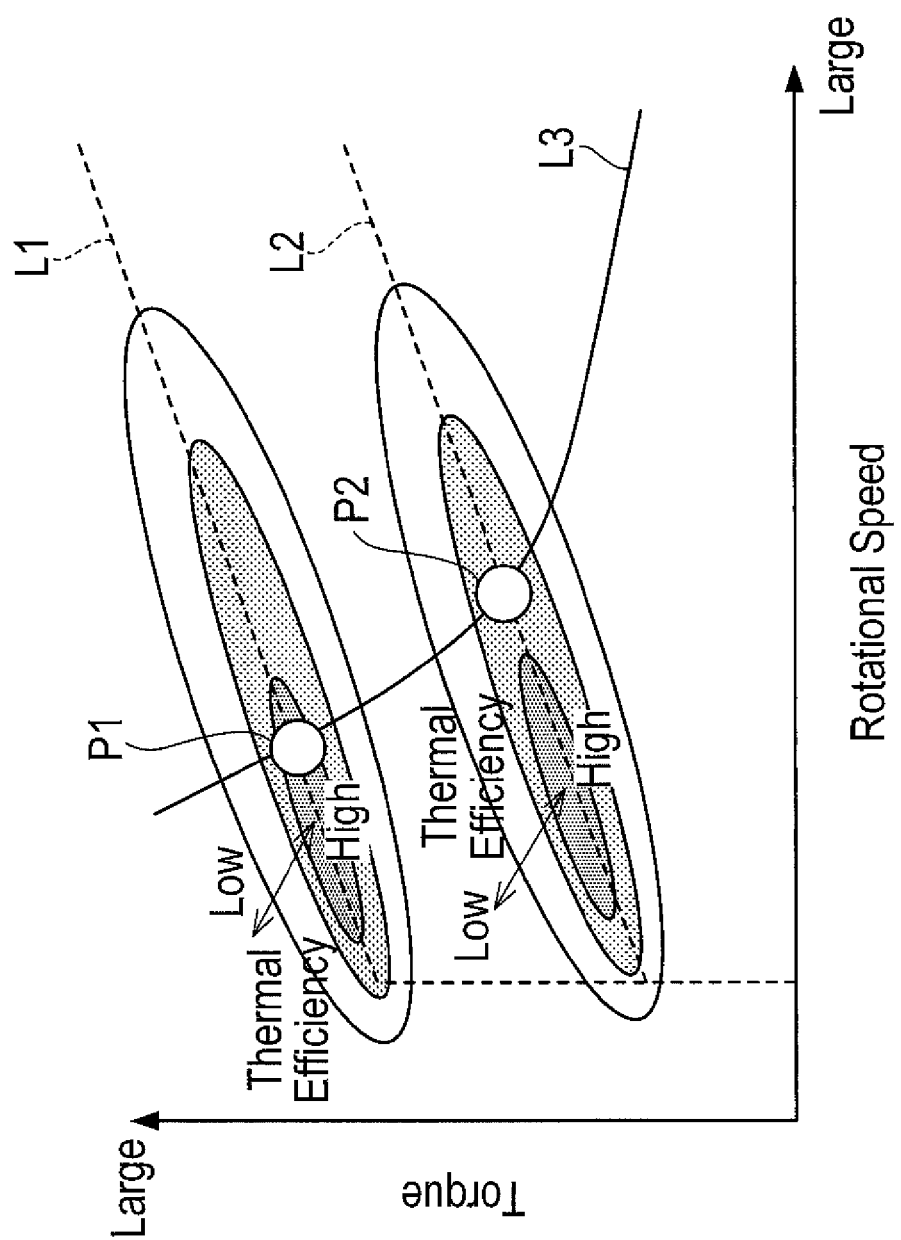
FIG. 4 is a diagram showing a relation between rotational speed, torque, and thermal efficiency of the engine.

Next, the rotational speed Ne and the torque Te of the engine 11 are calculated based on the calculated required engine power. FIG. 4 shows a relation between rotational speed, the torque, and thermal efficiency of the engine 11. A broken line L1 in this figure is an operating line which is set so that the fuel efficiency is optimized when the engine 11 is operated in the all-cylinder operation mode. A broken line L2 is an operating line which is set so that the fuel efficiency is optimized when the engine 11 is operated in the reduced-cylinder operation mode. And, a solid line L3 shows an equal power line which is fixed by the calculated required engine power. The relation between the rotational speed, the torque, and the thermal efficiency of the engine 11 on the broken line L1 shows a relation when the engine 11 is operated in the all-cylinder operation mode. The relation between the rotational speed, the torque, and the thermal efficiency of the engine 11 on the broken line L2 shows a relation when the engine 11 is operated in the reduced-cylinder operation mode. The thermal efficiency of the reduced-cylinder operation mode shows thermal efficiency in consideration of friction loss of the deactivated two cylinders 11a. When the motor lock mechanism 23 is in the released state, it is possible to set the torque and the rotational speed of the engine 11 without any restriction of the driving torque required to the vehicle 1 and the vehicle speed. As described above, in the first driving mode, the engine 11 is operated in the all-cylinder operation mode. Thereby, a rotational speed of a point P1 where the broken line L1 and the solid line L3 intersect with each other is calculated as the rotational speed Ne of the engine 11. Furthermore, a torque of the point P1 is calculated as the torque Te of the engine 11. The relations shown in FIG. 4 may be obtained in advance through experiments, numerical calculations, or the like, and stored as a map in the RON of the vehicle control device 30. And the rotational speed Ne and the torque Te of the engine 11 may be calculated based on the map and the calculated required engine power.

Next, a calculation method of the rotational speed Ng and the torque Tg of the first MG 12 will be described. As described above, the ring gear R is connected with the driving wheel 2 via the output portion 17. Thereby, a rotational speed of the ring gear R can be calculated based on the vehicle speed. A rotational speed of the carrier C is equal to the rotational speed Ne of the engine 11. As well known, a rotational speed of the sun gear S is determined depending on the rotational speed of the ring gear R and the rotational speed of the carrier C. Thereby, it is possible to calculate the rotational speed Ng of the first MG 12 based on these rotational speeds. A torque is output from the first MG 12, the torque being required to keep the rotational speed of the first MG 12 to the calculated rotational speed Ng while transmitting the torque Te of the engine 11 to the ring gear R. Such the torque Tg may be calculated by using a well known method based on the torque Te of the engine 11 and a gear ratio of the power split mechanism 16. In the result, the rotational speed Ng and the torque Tg of the first MG 12 are calculated.

A calculation method of the rotational speed Nm and the torque Tm of the second MG 13 will be described. The second MG 13 is connected with the output portion 17 via the gear 21. Thereby, the rotational speed of the second MG 13 may be calculated by using a well known method based on the vehicle speed. On the other hand, as shown in FIG. 2, the torque Tm of the second MG 13 is calculated based on the required driving torque and a torque (hereinafter, referred to as a direct torque) which is transmitted to the output driven gear 20 via the power split mechanism 16 within the torque Te of the engine 11. It is necessary to output the required driving torque from the drive wheel 2. Thereby, when the direct torque is smaller than the required driving torque, it is necessary to output torque from the second MG 13. Accordingly, the torque Tg of the second MG 13 is determined by subtracting the direct torque from the required driving torque. The direct torque is a torque in which the torque Te of the engine 11 is transmitted to the output driven gear 20 via the power split mechanism 16. And, the direct torque is a value which is determined unambiguously based on the number Ns of teeth of the sun gear S and the number Nr of teeth of the ring gear R of the planetary gear mechanism which composes the power split mechanism 16. When a ratio between the number of teeth of the ring gear R and the number of the teeth of the sun gear S is shown as $\rho$ ($=Ns/Nr$), the direct torque is obtained by $Te*1/(1+\rho)$. Thereby, the direct torque can be calculated based on the torque Te of the engine 11 and the above ratio $\rho$ of the number of teeth.

Figure 5:
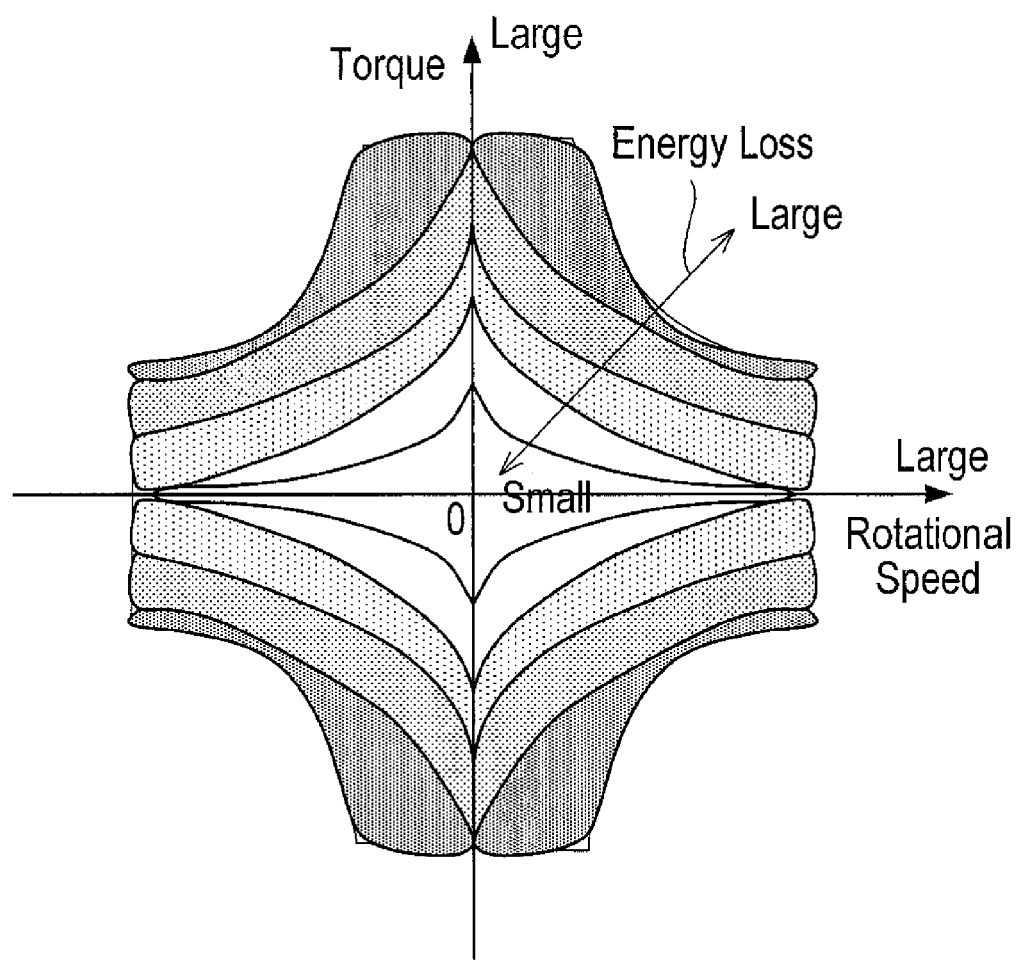
FIG. 5 is a diagram showing a relation between rotational speed, torque, and energy loss of the first MG.
Figure 6:
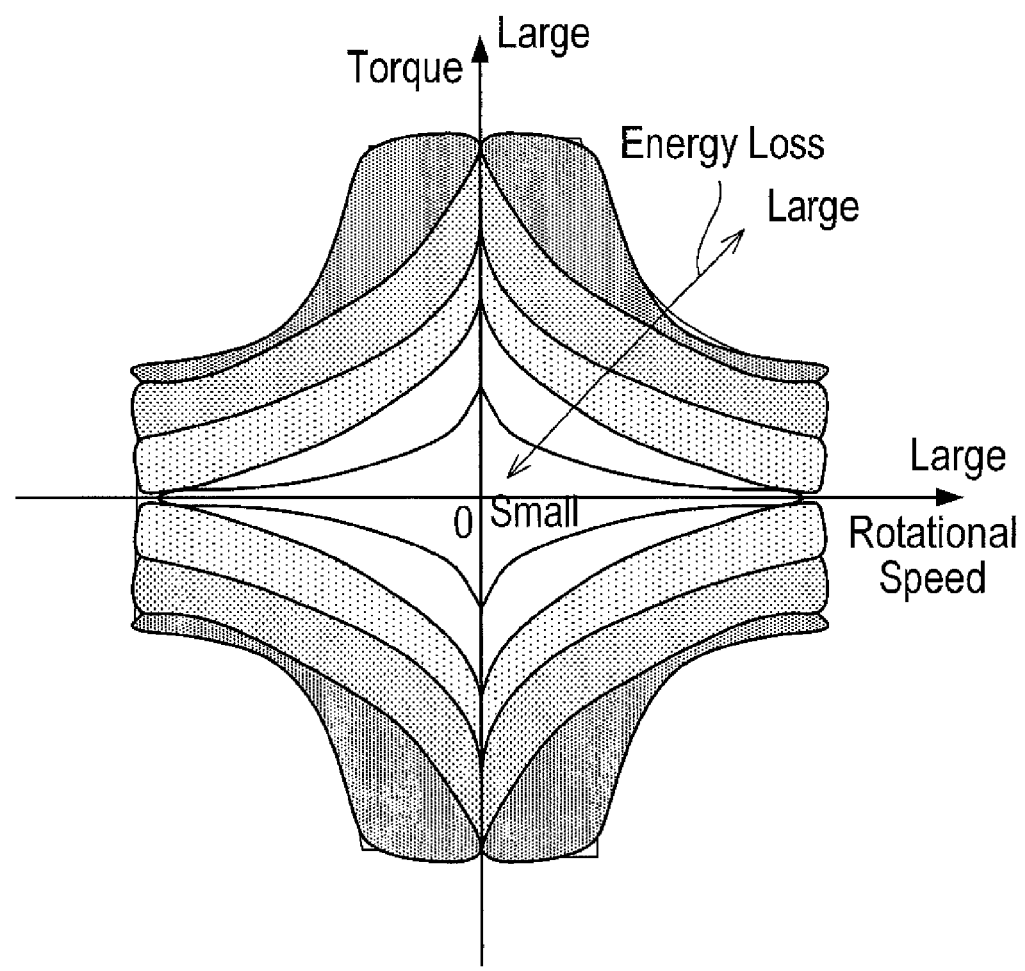
FIG. 6 is a diagram showing a relation between rotational speed, torque, and energy loss of the second MG.

After calculating the rotational speed Ng and the torque Tg of the first MG 12, and the rotational speed Nm and the torque Tm of the second MG 13 in this manner, the energy loss Pg_loss in the first MG 12 and the energy loss Pm_loss in the second MG 13 are calculated based on these estimate value. FIG. 5 shows a relation between the rotational speed Ng, the torque Tg, and the energy loss Pg_loss of the first MG 12. As shown in this figure, the energy loss Pg_loss in the first MG 12 relates to the rotational speed Ng and the torque Tg of the first MG 12. Thereby, it is possible to calculate the energy loss Pg_loss in the first MG 12 based on the calculated rotational speed Ng and the calculated torque Tg of the first MG 12, and the relation shown in this figure. FIG. 6 shows a relation between the rotational speed Ng, the torque Tg, and the energy loss Pm_loss with respect to the second MG 13. As with the above first MG 12, the energy loss Pm_loss in the second MG 13 also relates to the rotational speed Ng and the torque Tg of the second MG 13. Thereby, it is possible to calculate the energy loss Pm_loss in the second MG 13 based on the calculated rotational speed Nm and the torque Tm of the second MG 13, and the relation shown in this figure. The relations shown in these figures may be obtained in advance through experiments, numerical calculations, or the like and stored as a map in the ROM of the vehicle control device 30.

Next, as shown in FIG. 2, it is determined whether or not an absolute value (hereinafter, referred to as an error) of a value obtained by subtracting a total value (Pg_loss+Pm_loss)n−1 of the energy loss Pg_loss of the first MG 12 and the energy loss Pm_loss of the second MG 13 which was calculated previous time, from a total value (Pg_loss+Pm_loss)n of the energy loss Pg_loss of the first MG 12 and the energy loss Pm_loss of the second MG 13 which are calculated at this time, is less than or equal to a permitted value $\delta$. When the energy loss Pg_loss of the first MG 12 and the energy loss Pm_loss of the second MG 13 is calculated at first time, zero is substituted into the total value (Pg_loss+Pm_loss)n−1 of the energy loss Pg_loss of the first MG 12 and the energy loss Pm_loss of the second MG 13 which should be calculated previous time. When the error is greater than the permitted value $\delta$, the energy loss Pg_loss of the first MG 12 and the energy loss Pm_loss of the second MG 13 are added to the required engine power, and the above calculation is performed again. And, the calculation is performed repeatedly until the error becomes less than or equal to the permitted value $\delta$. When the error becomes less than or equal to the permitted value $\delta$, it is determined that the calculation converges, and calculated values Ne, Te, Ng, Tg, Nm, Tm at the moment are worked out as the torque and the rotational speed of the engine 11, the torque and the rotational speed of the first MG 12, and the torque and the rotational speed of the second MG 13 in the first driving mode respectively. The permitted value $\delta$ may be set appropriately so that the above repeated calculations are finished at predetermined times, for example 20 times or less, and it is possible to estimate appropriately: the torque Te and the rotational speed Ne of the engine 11; the torque Tg and the rotational speed Ng of the first MG 12; and the torque Tm and the rotational speed Nm of the second MG 13.

The energy loss Pg_loss of the first MG 12 and the energy loss Pm_loss of the second MG 13 are worked out by the above repeated calculations. A remaining energy loss Pe_loss of the engine 11 is worked out by a following equation (1).

$$Pe\_loss = Pe \cdot (1-\alpha)/\alpha \tag{1}$$

"Pe" in the equation is the required engine power. Furthermore, "$\alpha$" is thermal efficiency of the engine 11. The thermal efficiency may be calculated based on: the calculated torque Te and the rotational speed Ne of the engine 11; and the map shown in FIG. 4. In this moment, the thermal efficiency a is calculated by using the relation on the broken line L1 of FIG. 4.

Thereafter, by summing the calculated energy loss Pe_loss of the engine 11, the calculated energy loss Pg_loss of the first MG 12, and the calculated energy loss Pm_loss of the second MG 13, an energy loss (hereinafter, referred to as a total loss) of the driving apparatus 10 in the first driving mode may be calculated.

Next, a calculation method of the energy loss of the driving apparatus 10 in the fourth driving mode will be described. As described above, the fourth driving mode is the same as the first driving mode except that the engine 11 is operated in the reduced-cylinder operation mode. Thereby, in the calculation method of the fourth driving mode, the calculation methods of the rotational speed Ne and the torque Te of the engine 11 are different from the calculation methods of the first driving mode, and the rest calculation methods are the same as those in the first driving mode. Thereby, descriptions which can be shared with the calculation methods of the first driving mode will be omitted.

The calculation is performed as with the calculation method of the first driving mode until the required engine power is calculated. As described above, the broken line L2 of FIG. 4 is the operating line which is set so that the fuel efficiency is optimized when the engine 11 is operated in the reduced-cylinder operation mode. Thereby, in the fourth driving mode, when the equal power line (solid line L3) is determined by the calculated required engine power, rotational speed of a point P2 where the broken line L2 and the solid line L3 intersect with each other is set as the rotational speed Ne of the engine 11. Furthermore, torque of the point P2 is calculated as the torque Te of the engine 11. Thereafter, the calculation is performed as with the calculation method of the first driving mode. And, when the error becomes less than or equal to the permitted value δ, calculated values Ne, Te, Ng, Tg, Nm, Tm at the moment are worked out as the torque and the rotational speed of the engine 11, the torque and the rotational speed of the first MG 12, and the torque and the rotational speed of the second MG 13 in the fourth driving mode respectively.

Thereafter, the thermal efficiency α of the engine 11 is calculated as with the calculation method of the first driving mode. However, the thermal efficiency α is obtained by using the relation on the broken line L2 of FIG. 4. As described above, the relation on the broken line L2 is in consideration of the friction loss of the deactivated cylinders 11a. Thereby, the obtained thermal efficiency α in this manner is a thermal efficiency which is in consideration of the friction loss of the deactivated cylinders 11a. Next, the energy loss Pe_loss of the engine 11 is calculated by using the obtained thermal efficiency α and the above equation (1). And, by summing the calculated energy loss Pe_loss of the engine 11, the calculated energy loss Pg_loss of the first MG 12, and the calculated energy loss Pm_loss of the second MG 13, the total loss in the fourth driving mode is calculated.

Next, a calculation method of the energy loss of the driving apparatus 10 in the second driving mode will be described. In the second driving mode, the motor lock mechanism 23 is switched to the engaged state. In this case, the torque and the rotational speed with respect to each of the engine 11, the first MG 12, and the second MG 13 are calculated by the calculation method shown in FIG. 3.

In the calculation method of the second driving mode, the calculation is performed as with the calculation method of the first driving mode until the required engine power is calculated. However, as described above, when the motor lock mechanism 23 is switched to the engaged state, the rotation of the rotor 12a of the first MG 12 and the rotation of the sun gear S are prevented. In the result, since the power split mechanism 16 is switched to the non-differential state, the rotational speed Ne of the engine 11 is determined by the vehicle speed. And, the torque Te of the engine 11 is calculated by dividing the required engine power by the rotational speed Ne as shown in this figure. In the result, the rotational speed Ne and the torque Te of the engine 11 are calculated.

As described above, in the second driving mode, the rotation of the rotor 12a of the first MG 12 is prevented. Thereby, the rotational speed Ng and the torque Tg of the first MG 12 become zero respectively. Accordingly, as shown apparently in FIG. 5, the energy loss Pg_loss of the first MG 12 becomes zero.

On the other hand, the rotational speed Nm and the torque Tm of the second MG 13 are calculated in the same calculation methods as those used when the motor lock mechanism 23 is in the released state. That is, the rotational speed Nm of the second MG 13 is calculated based on the vehicle speed. The torque Tm of the second MG 13 is calculated based on the required driving torque and the direct torque.

In the second driving mode, as with the calculation method of the first driving mode, the error is calculated, and the calculation is performed repeatedly until the error becomes less than or equal to the permitted value δ. And, when the error becomes less than or equal to the permitted value δ, calculated values Ne, Te, Ng, Tg, Nm, Tm at the moment are worked out as the torque and the rotational speed of the engine 11, the torque and the rotational speed of the first MG 12, and the torque and the rotational speed of the second MG 13 in the second driving mode.

Next, the energy loss Pe_loss of the engine 1 is calculated. In this case, first, the thermal efficiency α is calculated based on the calculated rotational speed Ne and the calculated torque Te of the engine 11 and the map of FIG. 4. However, in the second driving mode, the engine 11 is operated in the all-cylinder operation mode. Thereby, the thermal efficiency α is obtained by using the relation on the broken line L1 of FIG. 4. Thereafter, the energy loss Pe_loss of the engine 11 is calculated by substituting the thermal efficiency α and the required engine power Pe into the above equation (1). And, by summing the calculated energy loss Pe_loss of the engine 11, the calculated energy loss Pg_loss of the first MG 12, and the calculated energy loss Pm_loss of the second MG 13, the total loss in the second driving mode is calculated.

Next, a calculation method of the energy loss of the driving apparatus 10 in the third driving mode will be described. As described above, in the third driving mode, the engine 11 is operated in the reduced-cylinder operation mode, and the motor lock mechanism 23 is switched to the engaged state. Thereby, in the calculation method of the third driving mode, a method of obtaining the thermal efficiency α of the engine 11 is different from the calculation method of the second driving mode, and the rest calculation methods are the same as those in the second driving mode. Thereby, descriptions which can be shared with the calculation methods of the second driving mode will be omitted.

In the calculation method of the third driving mode, the calculation is performed as with the calculation methods of the second driving mode until the torque Te and the rotational speed Ne of the engine 11, the torque Tg and the rotational speed Ng of the first MG 12, and the torque Tm and the rotational speed Nm of the second MG 13 are calculated. Thereafter, the energy loss Pe_loss of the engine 11 is calculated by using the calculated torque Te and the calculated rotational speed Ne of the engine 11. However, in the third driving mode, the engine 11 is operated in the reduced-cylinder operation mode. Thereby, when the thermal efficiency α of the engine 11 is calculated, the relation on the broken line L2 of FIG. 4 is used. Thereafter, the energy loss Pe_loss of the engine 11 is calculated by substituting the thermal efficiency α and the required engine power Pe into the above equation (1). And, by summing the calculated energy loss Pe_loss of the engine 11, the calculated energy loss Pg_loss of the first MG 12, and the calculated energy loss Pm_loss of the second MG 13, the total loss in the third driving mode is calculated.

Figure 7:
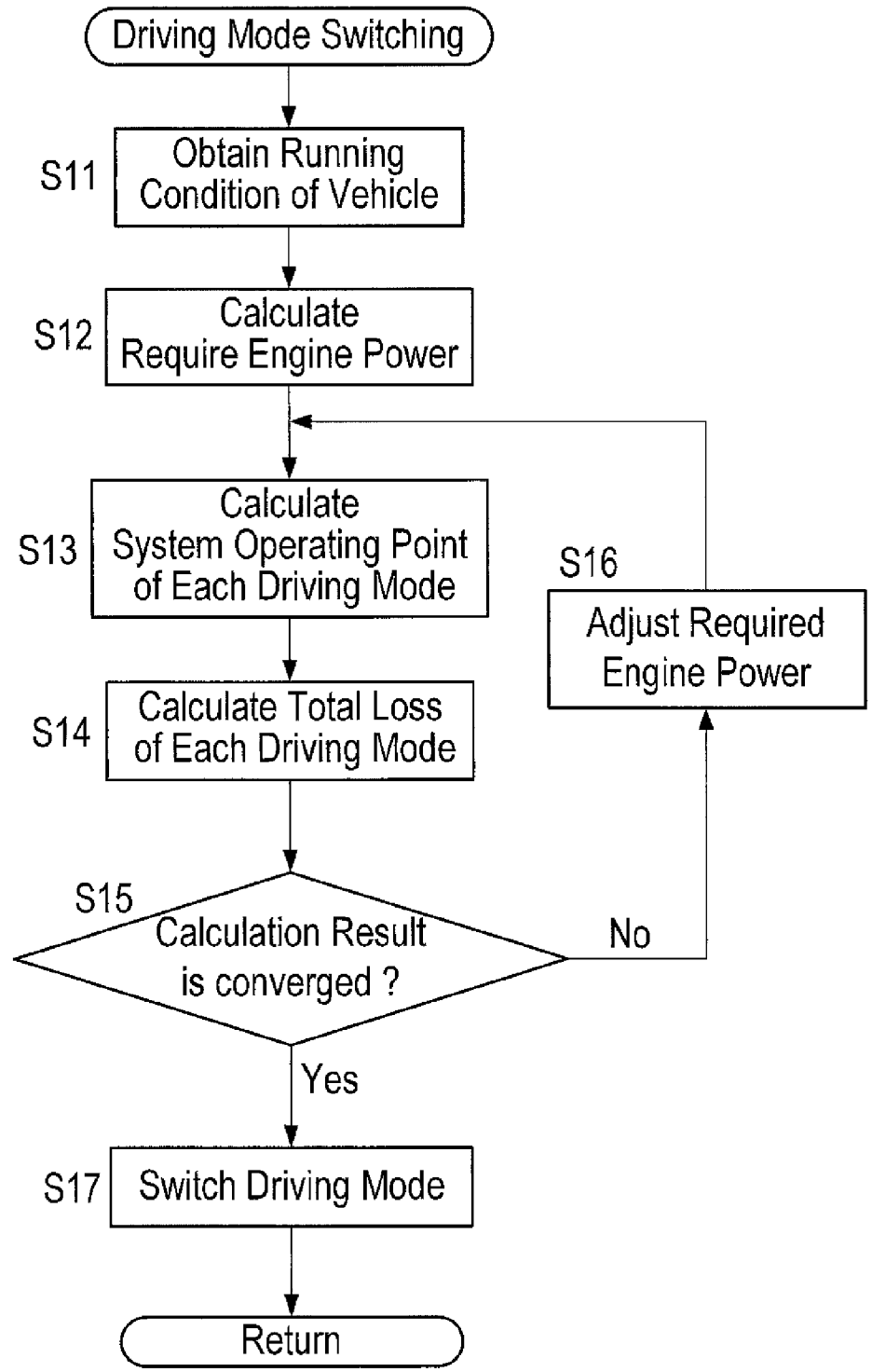
FIG. 7 is a flowchart showing a driving mode switching routine executed by a vehicle control device.

FIG. 7 shows a driving mode switching routine in which the vehicle control device 30 executes for switching the driving mode of the vehicle 1. The vehicle control device 30 repeatedly executes the routine at predetermined intervals while the vehicle 1 is running and also the engine 11 is being operated.

In the routine, the vehicle control device 30 first obtains the running state of the vehicle 1 in step S11. The vehicle control device 30 obtains the vehicle speed, the accelerator opening degree, and the charging state of the battery 15 as the running state of the vehicle 1. In this process, the vehicle control device 30 obtains various kinds of information relating to the vehicle 1 in addition to the above information, but descriptions of them will be omitted. In next step S12, the vehicle control device 30 calculates the required engine power. The required engine power may be calculated by using the above described calculation method based on the vehicle speed, the accelerator opening degree, and the charge and discharge power of the battery 15.

In next step S13, the vehicle control device 30 calculates a system operating point of each driving mode. In this process, the torque Te and the rotational speed Ne of the engine 11, the torque Tg and the rotational speed Ng of the first MG 12, and the torque Tm and the rotational speed Nm of the second MG 13 in each driving mode are calculated by using the calculation methods shown in FIG. 2 and FIG. 3.

In next step S14, the vehicle control device 30 calculates the total loss of each driving mode. In this process, the vehicle control device 30 calculates the total loss of each driving mode by using the torque Te and the rotational speed Ne of the engine 11, the torque Tg and the rotational speed Ng of the first MG 12, and the torque Tm and the rotational speed Nm of the second MG 13 which were calculated in step S13.

In next step S15, the vehicle control device 30 determines whether or not the calculation result is converged, that is, the errors of driving modes are less than or equal to the permitted value δ respectively. When the vehicle control device 30 determines that the calculation result is not converged, the vehicle control device 30 goes to step S16 and adjusts the required engine power. In this process, the vehicle control device 30 adds the energy loss Pg_loss of the first MG 12 and the energy loss Pm_loss of the second MG 13 to the present required engine power. Thereafter, the vehicle control device 30 goes to step S13. And, the vehicle control device 30 executes the processes of steps S13 to S16 repeatedly until the calculation result is converged.

On the other hand, when the vehicle control device 30 determines that the calculation result is converged, the vehicle control device 30 goes to step S17 and switches the driving mode of the vehicle 1 based on the total loss of each driving mode. In particular, the driving mode of the vehicle 1 is switched to a driving mode which has the smallest total loss, for example. Thereafter, the vehicle control device 30 ends the present routine.

Figure 8:
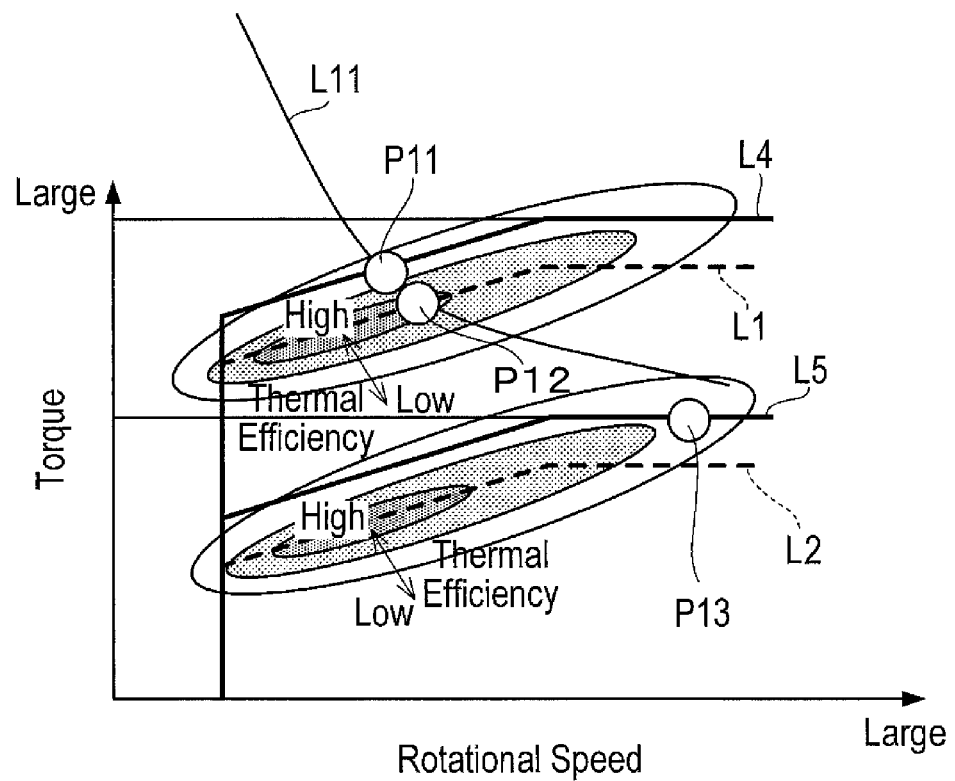
FIG. 8 is a diagram showing a relation between rotational speed, torque, and thermal efficiency of the engine when the vehicle runs at medium speed and medium torque is required to the vehicle.
Figure 9:
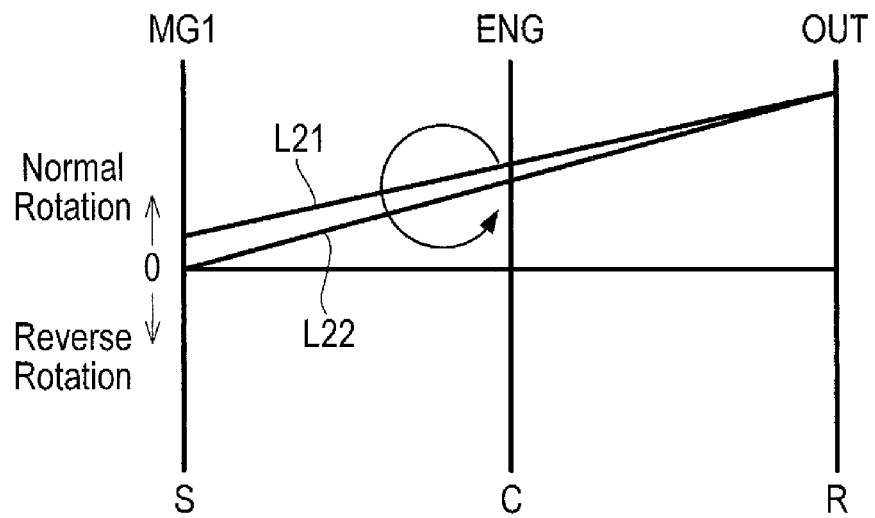
FIG. 9 is an alignment chart of a power split mechanism when the vehicle runs at medium speed and medium torque is required to the vehicle.

Running states of the vehicle 1 applied to each driving mode will be described with reference to FIGS. 8 to 17. A case in which the vehicle 1 runs at medium speed and medium torque is required to the vehicle 1 will be described with reference to FIG. 8 and FIG. 9. FIG. 8 shows a relation between the rotational speed, the torque, and the thermal efficiency of the engine 11. FIG. 9 shows an alignment chart of the power split mechanism 16. In FIG. 8, the same components as those in FIG. 4 are denoted by the same reference numerals, and descriptions thereof will be omitted.

A solid line L4 in FIG. 8 shows an operating line in which Maximum torque is output when the engine 11 is operated in the all-cylinder operation mode. A solid line L5 shows an operating line in which Maximum torque is output when the engine 11 is operated in the reduced-cylinder operation mode. A solid line L11 in FIG. 8 shows an equal power line which is obtained based on the required engine power of the engine 11 in this running state. A point P11 shows an operating point in a case that the driving mode of the vehicle 1 is switched to the second driving mode. A point P12 shows an operating point in a case that the driving mode of the vehicle 1 is switched to the first driving mode. A point P13 shows an operating point in a case that the driving mode of the vehicle 1 is switched to the fourth driving mode.

"ENG" in FIG. 9 shows the engine 11. "OUT" shows the output drive gear 19. "MG1" shows the first MG 12. "S" shows the sun gear S. "R" shows the ring gear R. "C" shows the carrier C. A solid line L21 of FIG. 9 shows a relation of each rotational element of the power split mechanism 16 to be obtained when the motor lock mechanism 23 is in the released state. A solid line L22 shows a relation of each rotational element of the power split mechanism 16 to be obtained when the motor lock mechanism 23 is in the engaged state.

As shown in FIG. 8, the solid line L11 does not intersect with the solid line L5. Thereby, it is impossible to switch to the third driving mode and the fourth driving mode. And, as shown in FIG. 9, there is little change in the rotational speed of the engine 11 between a case that the motor lock mechanism 23 is in the released state and a case that the motor lock mechanism 23 is in the engaged state. As described above, when the motor lock mechanism 23 is in the engaged state, the energy loss Pg_loss of the first MG 12 becomes zero. Thereby, in such the running state, the second driving mode is selected.

Figure 10:
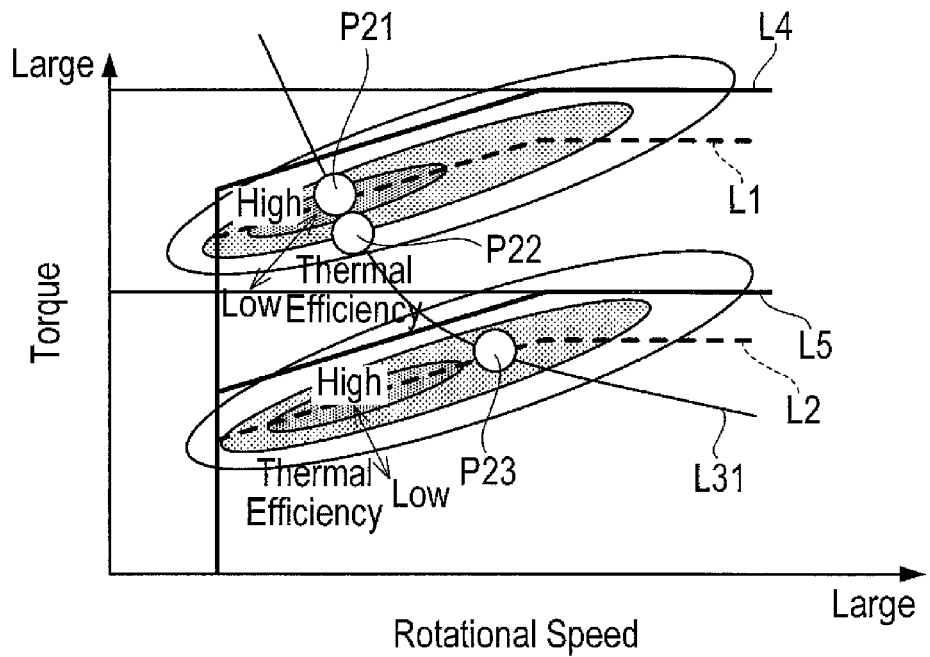
FIG. 10 is a diagram showing another example of relation between rotational speed, torque, and thermal efficiency of the engine when the vehicle runs at medium speed and medium torque is required to the vehicle.
Figure 11:
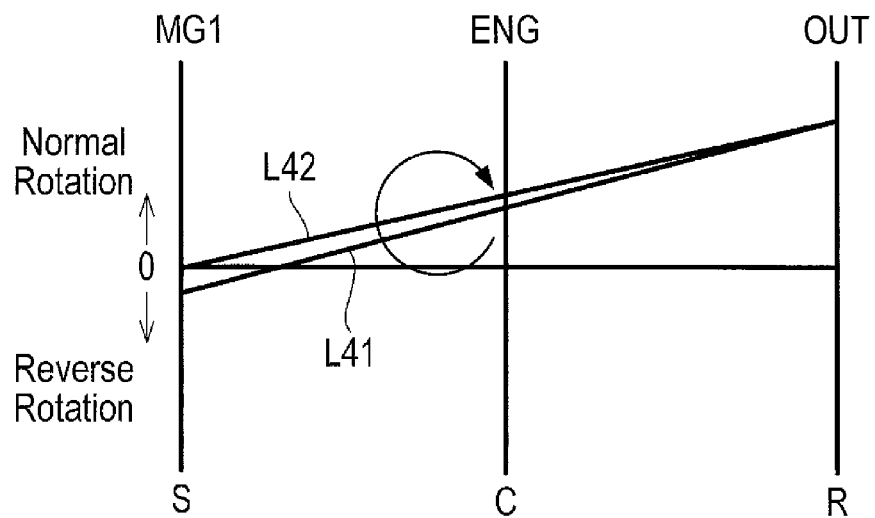
FIG. 11 is a diagram showing another example of alignment chart of the power split mechanism when the vehicle runs at medium speed and medium torque is required to the vehicle.

Another example in a case in which the vehicle 1 runs at medium speed and medium torque is required to the vehicle 1 will be described with reference to FIG. 10 and FIG. 11. FIG. 10 shows a relation between rotational speed, the torque, and the thermal efficiency of the engine 11. FIG. 11 shows an alignment chart of the power split mechanism 16. In these figures, the same components as those in FIG. 8 or FIG. 9 described above are denoted by the same reference numerals, and descriptions thereof will be omitted.

A solid line L31 in FIG. 10 shows an equal power line which is obtained based on the required engine power of the engine 11 in this running state. A point P21 shows an operating point in a case that the driving mode of the vehicle 1 is switched to the first driving mode. A point P22 shows an operating point in a case that the driving mode of the vehicle 1 is switched to the second driving mode. A point P23 shows an operating point in a case that the driving mode of the vehicle 1 is switched to the fourth driving mode. A solid line L41 in FIG. 11 shows a relation of each rotational element of the power split mechanism 16 to be obtained when the motor lock mechanism 23 is in the released state. A solid line L42 shows a relation of each rotational element of the power split mechanism 16 to be obtained when the motor lock mechanism 23 is in the engaged state.

As shown apparently in FIG. 10, the thermal efficiency of the engine 11 becomes the highest when the driving mode of the vehicle 1 is switched to the first driving mode. However, in the first driving mode, the energy loss is generated in the first MG 12. As shown in FIG. 11, also in this running state, there is little change in the rotational speed of the engine 11 between a case that the motor lock mechanism 23 is in the released state and a case that the motor lock mechanism 23 is in the engaged state. And, when the motor lock mechanism 23 is in the engaged state, the energy loss Pg_loss of the first MG 12 becomes zero. Thereby, also in this running state, the second driving mode is selected.

Figure 12:
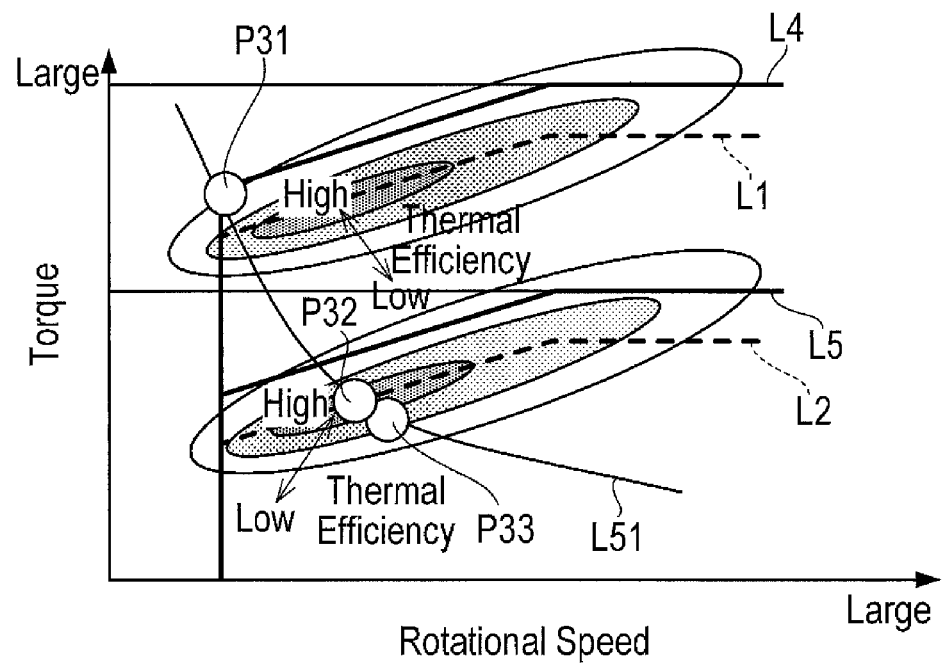
FIG. 12 is a diagram showing a relation between rotational speed, torque, and thermal efficiency of the engine when the vehicle runs at medium speed and low torque is required to the vehicle.
Figure 13:
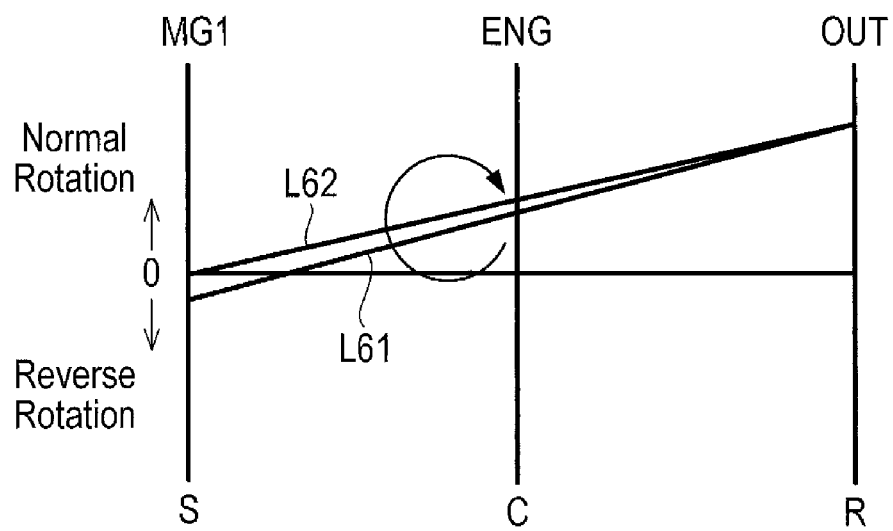
FIG. 13 is an alignment chart of the power split mechanism when the vehicle runs at medium speed and low torque is required to the vehicle.

A case in which the vehicle 1 runs at medium speed and low torque is required to the vehicle 1 will be described with reference to FIG. 12 and FIG. 13. FIG. 12 shows a relation between the rotational speed, the torque, and the thermal efficiency of the engine 11. FIG. 13 shows an alignment chart of a power split mechanism 16. In these figures, the same components as those in FIG. 8 or FIG. 9 described above are denoted by the same reference numeral, and descriptions thereof will be omitted.

A solid line L51 in FIG. 12 shows an equal power line which is obtained based on the required engine power of the engine 11 in this running state. A point P31 shows an operating point in a case that the driving mode of the vehicle 1 is switched to the first driving mode. A point P32 shows an operating point in a case that the driving mode of the vehicle 1 is switched to the fourth driving mode. A point P33 shows an operating point in a case that the driving mode of the vehicle 1 is switched to the third driving mode. A solid line L61 in FIG. 13 shows a relation of each rotational element of the power split mechanism 16 to be obtained when the motor lock mechanism 23 is in the released state. A solid line L62 shows a relation of each rotational element of the power split mechanism 16 to be obtained when the motor lock mechanism 23 is in the engaged state.

As apparently shown in FIG. 12, the thermal efficiency of the engine 11 becomes the highest when the driving mode of the vehicle 1 is switched to the fourth driving mode. However, in the fourth driving mode, the energy loss is generated in the first MG 12. As shown in FIG. 13, in this running state, there is little change in the rotational speed of the engine 11 between a case that the motor lock mechanism 23 is in the released state and a case that the motor lock mechanism 23 is in the engaged state. And, when the motor lock mechanism 23 is in the engaged state, the energy loss Pg_loss of the first MG 12 becomes zero. Thereby, in this running state, the third driving mode is selected.

Figure 14:
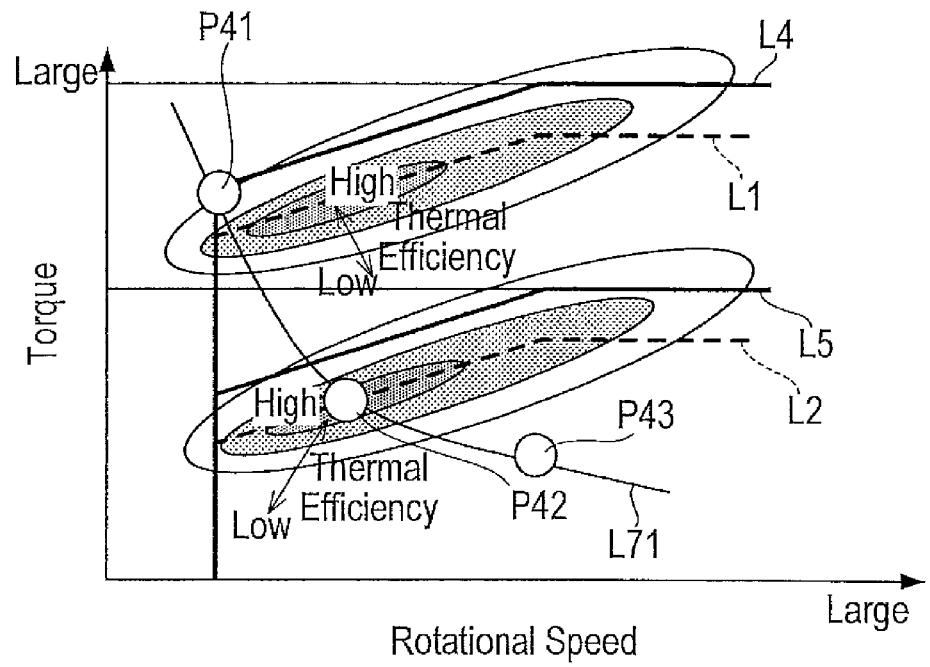
FIG. 14 is a diagram showing a relation between rotational speed, torque, and thermal efficiency of the engine when the vehicle runs at high speed and low torque is required to the vehicle.
Figure 15:
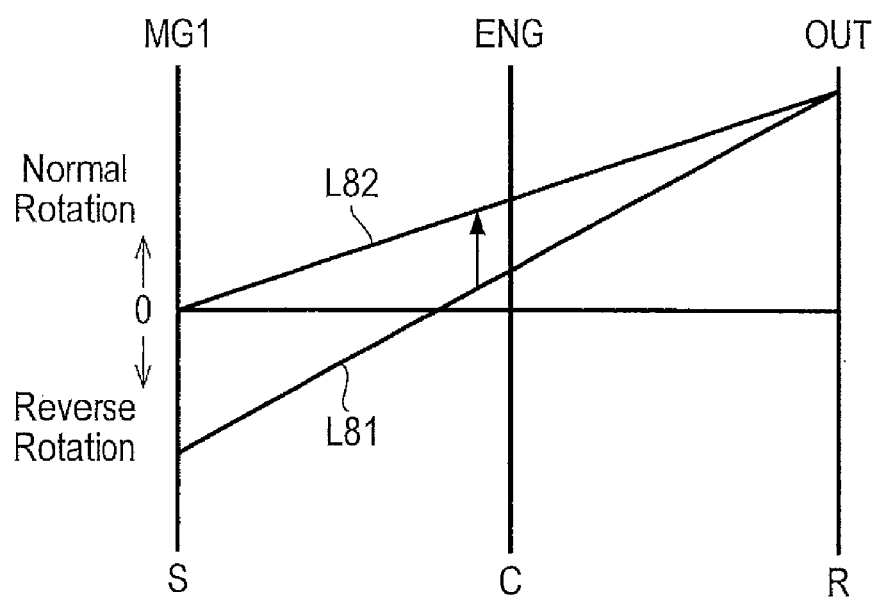
FIG. 15 is an alignment chart of the power split mechanism when the vehicle runs at high speed and low torque is required to the vehicle.

A case in which the vehicle 1 runs at high speed and low torque is required to the vehicle 1 will be described with reference to FIG. 14 and FIG. 15. FIG. 14 shows a relation between the rotational speed, the torque, and the thermal efficiency of the engine 11. FIG. 15 shows an alignment chart of a power split mechanism 16. In these figures, the same components as those in FIG. 8 or FIG. 9 described above are denoted by the same reference numeral, and descriptions thereof will be omitted.

A solid line 171 in FIG. 14 shows an equal power line which is obtained based on the required engine power of the engine 11 in this running state. A point P41 shows an operating point in a case that the driving mode of the vehicle 1 is switched to the first driving mode. A point P42 shows an operating point in a case that the driving mode of the vehicle 1 is switched to the fourth driving mode. A point P43 shows an operating point in a case that the driving mode of the vehicle 1 is switched to the third driving mode. A solid line L81 in FIG. 15 shows a relation of each rotational element of the power split mechanism 16 to be obtained when the motor lock mechanism 23 is in the released state. A solid line L82 shows a relation of each rotational element of the power split mechanism 16 to be obtained when the motor lock mechanism 23 is in the engaged state.

As apparently shown in FIG. 14, the thermal efficiency of the engine 11 becomes the highest when the driving mode of the vehicle 1 is switched to the fourth driving mode. In addition, as shown in FIG. 15, when the motor lock mechanism 23 is in the engaged state, the rotational speed of the engine 11 is increased, and the thermal efficiency of the engine 11 is decreased. Thereby, in this running state, the fourth driving mode is selected.

Figure 16:
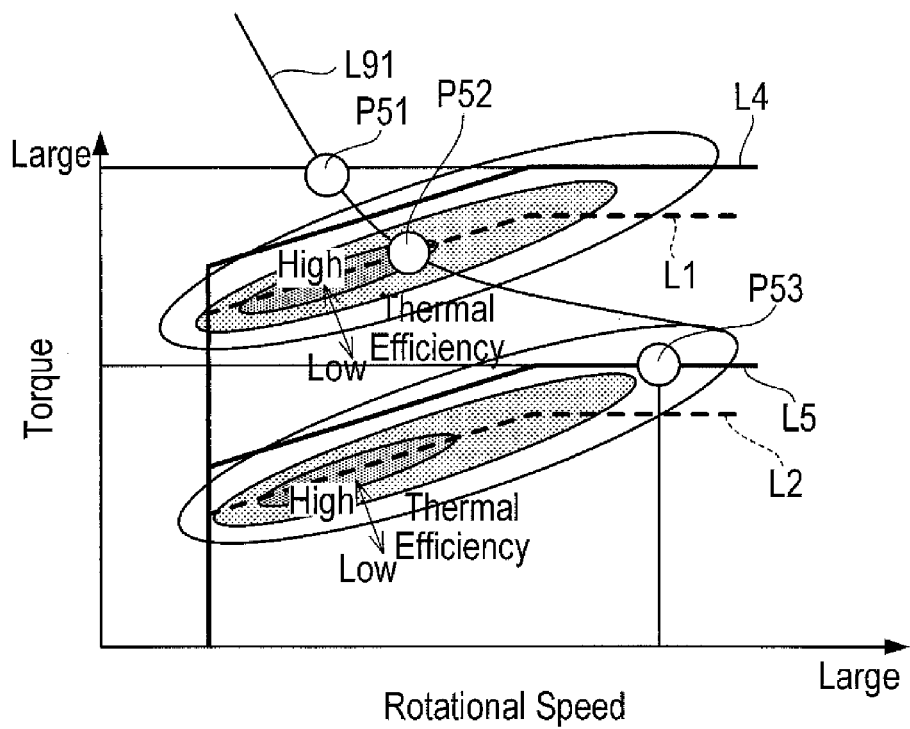
FIG. 16 is a diagram showing a relation between rotational speed, torque, and thermal efficiency of the engine when high torque is required to the vehicle.
Figure 17:
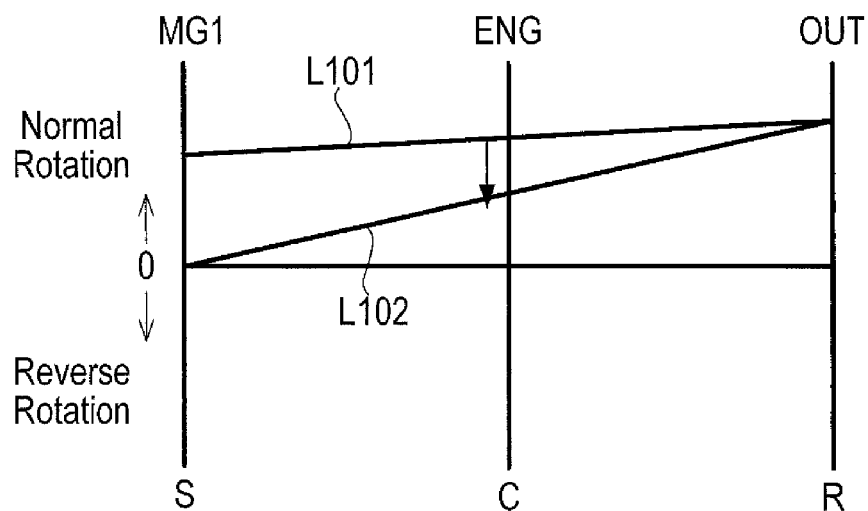
FIG. 17 is an alignment chart of the power split mechanism when high torque is required to the vehicle.

A case in which high torque is required to the vehicle 1 will be described with reference to FIG. 16 and FIG. 17. FIG. 16 shows a relation between the rotational speed, the torque, and the thermal efficiency of the engine 11. FIG. 17 shows an alignment chart of a power split mechanism 16. In these figures, the same components as those in FIG. 8 or FIG. 9 described above are denoted by the same reference numeral, and descriptions thereof will be omitted.

A solid line L91 in FIG. 16 shows an equal power line which is obtained based on the required engine power of the engine 11 in this running state. A point P51 shows an operating point in a case that the driving mode of the vehicle 1 is switched to the second driving mode. A point P52 shows an operating point in a case that the driving mode of the vehicle 1 is switched to the first driving mode. A point P53 shows an operating point in a case that the driving mode of the vehicle 1 is switched to the fourth driving mode. A solid line L101 in FIG. 15 shows a relation of each rotational element of the power split mechanism 16 to be obtained when the motor lock mechanism 23 is in the released state. A solid line L102 shows a relation of each rotational element of the power split mechanism 16 to be obtained when the motor lock mechanism 23 is in the engaged state.

As shown in FIG. 16, the solid line L91 does not intersect with the solid line L5. Thereby, it is impossible to switch to the third driving mode and the fourth driving mode. Furthermore, as shown in FIG. 17, when the motor lock mechanism 23 is in the engaged state, the rotational speed of the engine 11 is decreased. In the result, the torque of the engine 11 is increased and the thermal efficiency of the engine 11 is decreased. Thereby, in this running state, the first driving mode is selected.

As describe above, according to the control apparatus of the first embodiment, the total loss of each driving mode is calculated, and the driving mode of the vehicle 1 is switched based on these total losses. At this time, by switching to the driving mode in which the total loss is the smallest, it is possible to improve the energy efficiency of the vehicle 1. Thereby, it is possible to improve the fuel efficiency of the engine 11.

A method for including the friction loss of the deactivated cylinders 11a in the total loss of the driving mode is not limited to the method shown in the above described embodiment. For example, a map for calculating the friction loss of the deactivated cylinders 11a and a map for calculating the thermal efficiency α of the engine 11 in which the friction loss of the deactivated cylinders 11a is unconsidered are prepared. The thermal efficiency α and the friction loss are calculated separately. And, the total loss may be calculated by using these values.

By executing steps S12 to S16 in FIG. 7, the vehicle control device 30 functions as a first energy loss calculating device, a second energy loss calculating device, a third energy loss calculating device, and a fourth energy loss calculating device of the present invention. Furthermore, by executing step S17 in FIG. 7, the vehicle control device 30 functions as a driving mode switching device.

Second Embodiment

Figure 18:
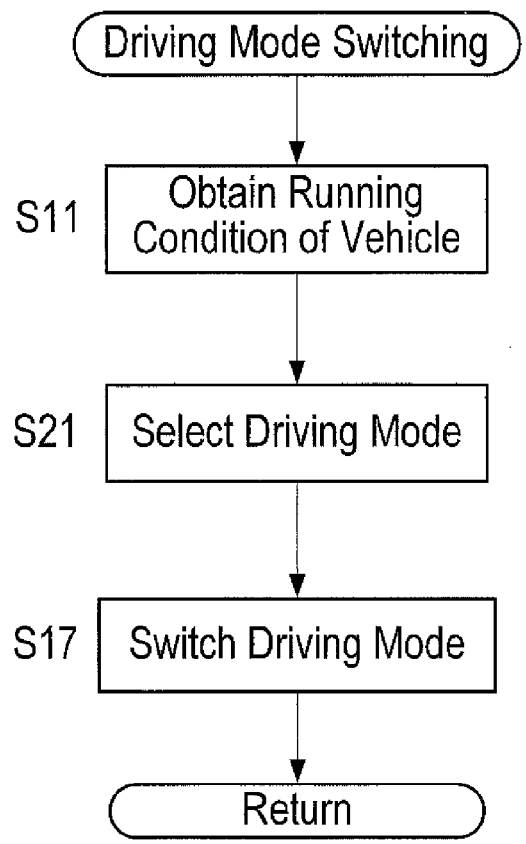
FIG. 18 is a flowchart showing a driving mode switching routine executed by the vehicle control device in a control apparatus according to a second embodiment of the present invention.
Figure 19:
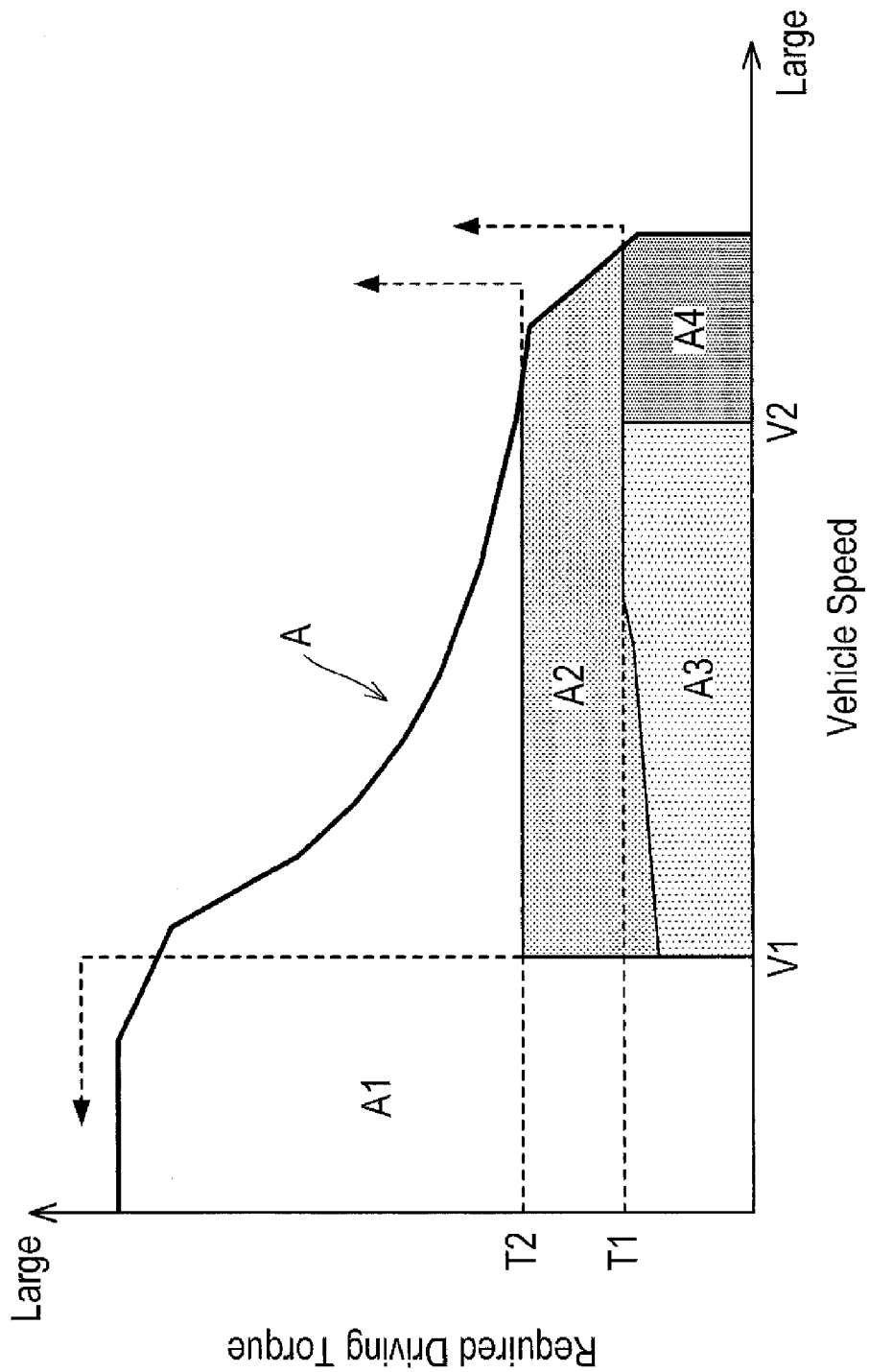
FIG. 19 is a diagram showing a relation between vehicle speed, driving torque required to the vehicle, and each driving mode.

Next, a control apparatus according to a second embodiment of the present invention will be described with reference to FIG. 18 and FIG. 19. FIG. 1 is referred also in this embodiment with regard to the vehicle 1. Furthermore, also in this embodiment, the first to fourth driving modes are provided as the driving mode of the vehicle 1. FIG. 18 shows a driving mode switching routine executed by the vehicle control device 30 in this embodiment. FIG. 19 shows a relation between the vehicle speed, the driving torque required to the vehicle 1, and each driving mode.

In this embodiment, the driving mode of the vehicle 1 is switched based on the relations shown in FIG. 19. As described in the first embodiment, when the vehicle 1 runs at medium speed and medium torque is required to the vehicle 1, the second driving mode is selected. When the vehicle 1 runs at medium speed and low torque is required to the vehicle 1, the third driving mode is selected. When the vehicle 1 runs at high speed and low torque is required to the vehicle 1, the fourth driving mode is selected. When high torque is required to the vehicle 1, the first driving mode is selected. In this manner, a driving mode in which the total loss becomes the smallest exists corresponding to the vehicle speed of the vehicle 1 and the required driving torque. FIG. 19 shows a relation between the running state of the vehicle 1 and the driving mode in which the total loss becomes the smallest in this running state.

A region A which is enclosed a thick solid line in FIG. 19 shows a region in which the driving apparatus 10 can be operated. And, a region A1 shows a region in which the first driving mode is selected. A region A2 shows a region in which the second driving mode is selected. A region A3 shows a region in which the third driving mode is selected. A region A4 shows a region in which the fourth driving mode is selected. As shown in this figure, a region in which the required driving torque is less than a predetermined first torque T1 and the vehicle speed is greater than or equal to a predetermined second vehicle speed V2 is set as the region A4 in which the fourth driving mode is selected. A region in which the required driving torque is less than the predetermined first torque T1 and the vehicle speed ranges from a predetermined first vehicle speed V1 to the second vehicle speed V2 is set as the region A3 in which the third driving mode is selected. A region in which the required driving torque ranges from the first torque T1 to a second torque T2 and the vehicle speed is greater than or equal to the first vehicle speed V1 is set as the region A2 in which the second driving mode is selected. A region remaining except the above regions A2 to A4 is set as the region A1 in which the first driving mode is selected. The relations shown in this figure may be obtained in advance through experiments, numerical calculations, or the like and stored as a map in the ROM of the vehicle control device 30. At this time, for example, the driving mode in which the total loss becomes the smallest for each operating state is calculated by using the calculation method shown in the first embodiment, and the map may be made based on the calculation results.

In this embodiment, the vehicle control device 30 switches the driving mode of the vehicle 1 by executing the driving mode switching routine of FIG. 18. The vehicle control device 30 repeatedly executes the routine at predetermined intervals while the vehicle 1 is running and also the engine 11 is being operated. In this routine, the same components as those in the routine of FIG. 7 are denoted by the same reference numeral, and descriptions thereof will be omitted.

In the routine, the vehicle control device 30 first obtains the running state of the vehicle 1 in step S11. In next step S21, the vehicle control device 30 selects the driving mode based on the obtained vehicle speed and the obtained accelerator opening degree. The driving torque required to the vehicle 1 can be calculated based on the accelerator opening degree. And, by using FIG. 19, it is possible to select a driving mode in which the total loss becomes the smallest based on the vehicle speed and the required driving torque. In next step S17, the vehicle control device 30 switches the driving mode of the vehicle 1 to the selected driving mode. Thereafter, the vehicle control device 30 ends the present routine.

As described above, in the second embodiment, the relations between the running state of the vehicle 1 and the driving mode in which the total loss becomes the smallest in the running state are obtained in advance and stored as a map in the ROM of the vehicle control device 30. And, the driving mode to be switched is selected based on the map. Thereby, it is possible to reduce load of the vehicle control device 30. Furthermore, since the driving mode in which the total loss becomes the smallest is selected as the driving mode of the vehicle 1, it is possible to improve the energy efficiency of the vehicle 1. Thereby, it is possible to improve the fuel efficiency of the engine 11.

By storing the map of FIG. 19, the vehicle control device 30 functions as a memory device of the present invention. Furthermore, the first vehicle speed V1 of the map of FIG. 19 corresponds to a low-speed running determination value of the present invention. The second vehicle speed V2 corresponds to a high-speed running determination value of the present invention. And, the first torque T1 of the map of FIG. 19 corresponds to a low torque determination value of the present invention. The second torque T2 corresponds to a high torque determination value of the present invention. Thereby, the region A1 in which the first driving mode is selected corresponds to a first region of the present invention. The region A2 in which the second driving mode is selected corresponds to a second region of the present invention. The region A4 in which the fourth driving mode is selected corresponds to a third region of the present invention. If the third driving mode is not set as a driving mode, the region A3 may be included in the region A1. In this case, the fourth driving mode may be referred to as a reduced-cylinder driving mode.

The present invention is not limited to the above-described embodiments, and various modifications of the present invention may be provided. For example, a vehicle which is applied to the present invention is not limited to the hybrid vehicle for which the first to fourth driving modes are set as driving modes thereof. For example, the present invention may be applied to a hybrid vehicle for which only the first driving mode and the second driving mode are set as the driving modes thereof. Furthermore, the present invention may be applied to a hybrid vehicle for which the first to third driving modes are set as the driving modes thereof.

In above-described each embodiment, by locking the first MG 12 by the motor lock mechanism 23, the power split mechanism 16 as a differential mechanism is switched from the differential state to the non-differential state. However, a state switching device for switching the differential mechanism from the differential state to the non-differential state is not limited to one that prevents the rotation of the first MG itself. For example, it would also be possible to cut off the power transmission path from the differential mechanism to the first MG with a clutch and to implement a state switching device that fixes some component on the side of the differential mechanism, thus switching the differential mechanism from the differential state to the non-differential state with this state switching device.

The invention claimed is:

1. A control apparatus which is applied to a hybrid vehicle in which a driving apparatus is mounted,
    the driving apparatus including:
    an internal combustion engine;
    a first motor generator;
    an output portion for transmitting torque to a drive wheel;
    a differential mechanism which splits torque of the internal combustion engine into the first motor generator and the output portion;
    a second motor generator which is connected with the output portion via a gear; and
    a state switching device which is capable of switching a state of the differential mechanism between a differential state in which the torque of the internal combustion engine is split into the first motor generator and the output portion, and a non-differential state in which the split of the torque is stopped,
    the internal combustion engine has plural cylinders and is operated in: a reduced-cylinder operation mode in which a portion of the plural cylinders is deactivated and remaining cylinders are activated; or an all-cylinder operation mode in which all cylinders are activated, and
    the hybrid vehicle is capable of switching a driving mode between a first driving mode in which the internal combustion engine is operated in the all-cylinder operation mode and the state of the differential mechanism is switched to the differential state, a second driving mode in which the internal combustion engine is operated in the all-cylinder operation mode and the state of the differential mechanism is switched to the non-differential state, a third driving mode in which the internal combustion engine is operated in the reduced-cylinder operation mode and the state of the differential mechanism is switched to the non-differential state, and a fourth driving mode in which the internal combustion engine is operated in the reduced-cylinder operation mode and the state of the differential mechanism is switched to the differential state, the control apparatus comprising:

a first energy loss calculating device which calculates energy loss in the driving apparatus to be generated when the driving mode of the vehicle is assumed to be switched to the first driving mode, based on energy loss in the internal combustion engine, energy loss in the first motor generator, and energy loss in the second motor generator;

a second energy loss calculating device which calculates energy loss in the driving apparatus to be generated when the driving mode of the vehicle is assumed to be switched to the second driving mode, based on energy loss in the internal combustion engine to be generated when the internal combustion engine is operated in a rotational speed determined depending on speed of the vehicle and torque determined depending on driving force required to the vehicle, and the energy loss in the second motor generator;

a third energy loss calculating device which calculates energy loss in the driving apparatus to be generated when the driving mode of the vehicle is assumed to be switched to the third driving mode, based on energy loss in the internal combustion engine to be generated when the internal combustion engine is operated in rotational speed which is determined depending on speed of the vehicle and torque which is determined depending on driving force required to the vehicle, friction loss in the portion of the plural cylinders, and the energy loss in the second motor generator;

a fourth energy loss calculating device which calculates energy loss in the driving apparatus to be generated when the driving mode of the vehicle is assumed to be switched to the fourth driving mode, based on the energy loss in the internal combustion engine, the friction loss in the portion of the plural cylinders, and the energy loss in the second motor generator;

a driving mode switching device which switches the driving mode of the vehicle based on the energy loss which is calculated by the first energy loss calculating device, the energy loss which is calculated by the second energy loss calculating device, the energy loss which is calculated by the third energy loss calculating device, and the energy loss which is calculated by the fourth energy loss calculating device; and a memory device which stores a map in which the speed of the vehicle and the driving torque required to the vehicle are corresponded to each of the first driving mode, the second driving mode, and the fourth driving mode;

in the map, a first region which corresponds to the first driving mode, a second region which corresponds to the second driving mode, and a third region which corresponds to the fourth driving mode are set so as not to overlap each other, the third region includes a region in which the speed of the vehicle is greater than or equal to a predetermined high-speed running determination value and the driving torque required to the vehicle is less than a predetermined low torque determination value in the map, the second region includes a region in which the speed of the vehicle is greater than or equal to a predetermined low-speed running determination value; and the driving torque required to the vehicle is greater than or equal to the low torque determination value and also less than a predetermined high torque determination value in the map, the first region includes a region in which the speed of the vehicle is less than the low-speed running determination value and the driving torque required to the vehicle is greater than or equal to the high torque determination value in the map, and the driving mode switching device switches the driving mode of the vehicle based on the speed of the vehicle, the driving torque required to the vehicle, and the map.

2. The control apparatus according to claim 1, wherein in the map, a fourth region which corresponds to the third driving mode is set so as not to overlap the first region, the second region, and the third region, and the fourth region which corresponds to the third driving mode includes a region in which the speed of the vehicle is less than the high-speed running determination value and also greater than or equal to the low-speed running determination value; and the driving torque required to the vehicle is less than the low torque determination value in the map.

* * * * *